(12) United States Patent
Horn et al.

(10) Patent No.: US 7,240,358 B2
(45) Date of Patent: *Jul. 3, 2007

(54) METHODS AND APPARATUS FOR SCHEDULING, SERVING, RECEIVING MEDIA-ON DEMAND FOR CLIENTS, SERVERS ARRANGED ACCORDING TO CONSTRAINTS ON RESOURCES

(75) Inventors: Gavin Horn, Emeryville, CA (US); Michael G. Luby, Berkeley, CA (US); Jens Rasmussen, Alameda, CA (US); Per Knudsgaard, Oakland, CA (US); Soren Lassen, San Francisco, CA (US)

(73) Assignee: Digital Fountain, Inc., Fremont, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 09/768,843

(22) Filed: Jan. 23, 2001

(65) Prior Publication Data

US 2002/0107968 A1    Aug. 8, 2002

Related U.S. Application Data

(60) Provisional application No. 60/254,514, filed on Dec. 8, 2000.

(51) Int. Cl.
*H04N 7/173* (2006.01)

(52) U.S. Cl. .................. 725/87; 725/90; 725/91; 725/114; 709/203; 709/231; 341/50; 341/55

(58) Field of Classification Search .............. 725/87, 725/90–93, 95, 97–98, 143–148, 114–118, 725/131, 151; 341/50, 55, 60, 51; 709/230–232, 709/225, 203, 223; 714/15, 785
See application file for complete search history.

(56) References Cited

U.S. PATENT DOCUMENTS 5,371,532 A    12/1994   Gelman et al.

(Continued)

FOREIGN PATENT DOCUMENTS

| WO | WO 01/57667 A1 | 8/2001 |
| WO | WO 01/58130 A2 | 8/2001 |
| WO | WO 01/58131 A2 | 8/2001 |

OTHER PUBLICATIONS

Wong, J. W., "Broadcast delivery", *Proceedings of the IEEE*, 76(12):1566-1577, (1988).

(Continued)

*Primary Examiner*—Ngoc Vu
(74) *Attorney, Agent, or Firm*—Philip H. Albert; Townsend and Townsend and Crew

(57) ABSTRACT

A media object is scheduled for transmission between a server and a client. The media object is partitioned into segments of blocks, wherein each block is a unit of media for which a client will wait to receive an entire block before playing out the block, and wherein each segment includes an integer number of blocks. One or more channels on which to serve each segment are determined, and a rate at which to serve each segment is determined. Additionally, a schedule pair for each channel is determined. The schedule pair includes a time at which the client may start receiving on the channel and a time at which the client may stop receiving on the channel.

94 Claims, 18 Drawing Sheets

U.S. PATENT DOCUMENTS

| | | | |
|---|---|---|---|
| 5,379,297 | A | 1/1995 | Glover et al. |
| 5,421,031 | A | 5/1995 | De Bey |
| 5,617,541 | A | 4/1997 | Albanese et al. |
| 5,659,614 | A | 8/1997 | Bailey, III |
| 5,701,582 | A | 12/1997 | DeBey |
| 5,751,336 | A | 5/1998 | Aggarwal et al. |
| 5,757,415 | A | 5/1998 | Asamizuya et al. |
| 5,835,165 | A | 11/1998 | Keale et al. |
| 5,903,775 | A | 5/1999 | Murray |
| 5,926,205 | A * | 7/1999 | Krause et al. ............... 725/103 |
| 5,936,659 | A | 8/1999 | Viswanathan et al. |
| 5,936,949 | A | 8/1999 | Pasternak et al. |
| 6,011,590 | A | 1/2000 | Saukkonen |
| 6,018,359 | A | 1/2000 | Kermode et al. |
| 6,073,250 | A | 6/2000 | Luby et al. |
| 6,081,909 | A | 6/2000 | Luby et al. |
| 6,134,596 | A * | 10/2000 | Bolosky et al. ............. 709/233 |
| 6,141,053 | A | 10/2000 | Saukkonen |
| 6,163,870 | A | 12/2000 | Luby et al. |
| 6,185,265 | B1 | 2/2001 | Campanella |
| 6,195,777 | B1 | 2/2001 | Luby et al. |
| 6,307,487 | B1 | 10/2001 | Luby |
| 6,320,520 | B1 | 11/2001 | Luby |
| 6,732,325 | B1 * | 5/2004 | Tash et al. .................. 714/785 |
| 6,882,618 | B1 * | 4/2005 | Sakoda et al. ............... 370/208 |

OTHER PUBLICATIONS

Viswanathan, et al., "Metropolitan area video-on-demand services using pyramid broadcasting", *Multimedia Systems*, 4(4):197-208 (1996).

Aggarwal, et al., "On optimal batching policies for video-on-demand storage servers", *Proc. Intl. Conf. on Multimedia Computing and Systems*, pp. 253-258, Hiroshima, Japan, (1996).

Almeroth, et al., "The use of multicast delivery to provide a scalable and interactive video-on-demand service", *IEEE Journal on Selected Areas in Communication*, 14(6):110-1122, (1996).

Dan, et al., "Scheduling policies for an on-demand video server with batching", *Proc. ACM Multimedia*, pp. 391-398 (1998).

Bar-Noy, et al., "Competitive on-line stream merging algorithms for media-on-demand", Draft (Jul. 2000).

Bar-Noy, et al., "Efficient algorithms for optimal stream merging for media-on-demand", Draft (Aug. 2000).

Eager, et al., "Minimizing bandwidth requirements for on-demand data delivery", *Proc. Intl. Workshop on Advances in Multimedia Information Systems*, pp. 80-87, (Indian Wells, CA, Oct. 1999).

Eager, et al., "Optimal and efficient merging schedules for video-on-demand servers", *Proc. ACM Multimedia*, vol. 7, pp. 199-203 (1999).

Aggarwal, et al., "A permutation-based pyramid broadcasting scheme for video-on-demand systems", *Proc. IEEE Int'l Conf. on Multimedia Systems*, (Hiroshima, Japan, Jun. 1996).

Hua, et al., "Skyscraper broadcasting: A new broadcasting system for metropolitan video-on demand systems", *Proc. ACM SIGCOMM*, pp. 89-100 (Cannes, France, 1997).

Gao, et al., "Efficient schemes for broadcasting popular videos", *Proc. Inter. Workshop on Network and Operating System Support for Digital Audio and Video*, (Jul. 1998).

Juhn, et al., "Harmonic broadcasting for video-on-demand service", *IEEE Trans. on Broadcasting*, 43:268-271 (1997).

Juhn, et al., "Adaptive fast data broadcasting scheme for video-on-demand service", *IEEE Trans. on Broadcasting*, 44:182-185 (1998).

Paris, et al., "Efficient broadcasting protocols for video on demand", *International Symposium on Modeling, Analysis and Simulation of Computer and Telecommunication Systems (MASCOTS)*, vol. 6, pp. 127-132 (Jul. 1998).

Paris, et al., "A low bandwidth broadcasting protocol for video on demand", *Proc. International Conference on Computer Communications and Networks*, vol. 7, pp. 690-697 (Oct. 1998).

Sincoskie, W. D., "System Architecture for Large Scale Video on Demand Service," *Computer Network and ISDN Systems*, pp. 155-162. (1991).

Rangan, et al., "Designing an On-Demand Multimedia Service," *IEEE Communication Magazine*, vol. 30, pp. 5-65, (Jul. 1992).

Ozden, et al, "A Low-cost Storage Service for Movie on Demand Databases," *Proceedings of the 20th Very Large DataBases (VLDB) Conference* (Santiago, Chile 1994).

Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).

Viswanathan, S.R., "Publishing in Wireless and Wireline Environments", Ph.D. Thesis, Rutgers, The State University of New Jersey (Nov. 1994).

\* cited by examiner

METHODS AND APPARATUS FOR SCHEDULING, SERVING, RECEIVING MEDIA-ON DEMAND FOR CLIENTS, SERVERS ARRANGED ACCORDING TO CONSTRAINTS ON RESOURCES

CROSS REFERENCES TO RELATED APPLICATIONS

The present invention claims priority from U.S. Provisional Application No. 60/254,514, filed Dec. 8, 2000 and entitled "METHOD FOR MEDIA-ON-DEMAND FOR CLIENTS AND SERVERS WITH CONSTRAINED RESOURCES", the entire disclosure of which is herein incorporated by reference for all purposes.

FIELD OF THE INVENTION

The present invention relates generally to media-on-demand systems, wherein a large number of clients might make requests of the system for a particular piece of media content that is served in real-time, or near real-time, to the clients. In particular, the present invention relates to optimized media-on-demand systems including systems using chain reaction codes.

BACKGROUND OF THE INVENTION

"Media-on-demand" ("MOD") is a term often used to refer to a client-server system, where many clients make requests from a choice of many possible media objects that are to be served by a server (or array of servers) to the clients. In general, a design goal of a MOD system is to allow a client to request a media object or stream and have the content play at the client with no interruptions. The on-demand implies that there is little to no delay experienced by the client before the media object starts playing out at the client. On-demand also implies that the media object starts playing out from the beginning or possibly some specified point in the content, as opposed to joining a transmission in progress. One example is a video-on-demand system, where large numbers of clients may each make requests among many different digital videos.

A digital cable broadcasting system is a digital video server, as it serves up many digital video streams to many clients (end-user televisions, for example). Such a system might support hundreds of independent video streams and millions of clients. The system can be easily built, however customers are constrained to receive only the pre-selected set of videos at the times selected by the system operator, so the system is not on-demand.

A true media-on-demand system is much more difficult to build because the system may have to serve as many different streams as there are active clients, as each client demands different content (media objects) or the same content at different times. Potentially each client will require an independent stream of the media object it requested, where a stream is the flow of data required by that client in order to play out the content from the beginning without interruptions.

Some work relating to MOD systems proposes using broadcast or multicast mechanisms in order for the MOD system to be scalable to a large number of clients. See for example, J. W. Wong, "Broadcast delivery", *Proceedings of the IEEE*, 76(12):1566–1577, (December 1988).

The different multicast or broadcast strategies that have been proposed in the literature can be divided into two distinct classes: (1) user-centered and (2) data-centered. See, e.g., S. Viswanathan and T. Imielinski, "Metropolitan area video-on-demand services using pyramid broadcasting", *Multimedia Systems*, 4(4):197–208 (August 1996) (hereinafter "Viswanathan"). In user-centered strategies, the server bandwidth is allocated according to client requests, i.e., the bandwidth assigned at the server to serve a particular media object can vary over time depending on how many clients are requesting that media object. In data-centered strategies, the server bandwidth is allocated among the different media objects, i.e., the bandwidth assigned at the server to serve a particular media object is constant over time.

A typical user-centered strategy is "batching", wherein all clients that make a request during an interval for the same media object are all serviced by one stream. There are a number of batching schemes that consider the various possible scheduling policies for assigning the available server bandwidth to a particular media object. See, e.g., C. Aggarwal, J. Wolf, and P. Yu, "On optimal batching policies for video-on-demand storage servers", *Proc. Intl. Conf on Multimedia Computing and Systems*, pp. 253–258, Hiroshima, Japan, (June 1996) (hereinafter "Aggarwal"); K. C. Almeroth and M. H. Ammar, "The use of multicast delivery to provide a scalable and interactive video-on-demand service", *IEEE Journal on Selected Areas in Communication*, 14(6):1110–1122, (August 1996); A. Dan, D. Sitaram, and P. Shahabuddin, "Scheduling policies for an on-demand video server with batching", *Proc. ACM Multimedia*, pp. 391–398 (October 1998).

Another user-centered approach is stream merging, where a client receives data from multiple streams simultaneously, and the extra streams are dropped once the client catches up to the next existing stream. See, e.g., A. Bar-Noy and R. E. Ladner, "Competitive on-line stream merging algorithms for media-on-demand", Draft (July 2000); A. Bar-Noy and R. E. Ladner, "Efficient algorithms for optimal stream merging for media-on-demand", Draft (August 2000); D. Eager, M. Vernon, and J. Zahorjan, "Minimizing bandwidth requirements for on-demand data delivery", *Proc. Intl. Workshop on Advances in Multimedia Information Systems*, pages 80–87, (Indian Wells, Calif., October 1999) (hereinafter "EagerMIS99"); and D. Eager, M. Vernon, and J. Zahorjan, "Optimal and efficient merging schedules for video-on-demand servers", *Proc. ACM Multimedia*, vol. 7, pages 199–203 (1999). For user-centered strategies, the server bandwidth requirement for a particular media object can be expected to grow with the frequency of user requests for that media object. This may be acceptable for a small number of users, but may be infeasible if the number of users grows very large for very popular content.

Data-centered strategies are scalable to potentially millions of users as, unlike user-centered strategies, the server bandwidth required to serve a single media object is independent of the number of user requests or the frequency of user requests. A simple data-centered strategy is to divide the available bandwidth for a media object equally among C channels, and to retransmit the media object over one of the channels at equally spaced time intervals. For example, some pay-per-view digital satellite systems show the same one and half to two hour movie on four different channels, where a new transmission starts every half an hour. In this case, the worst case startup latency is just less than half an hour, where the startup latency, Ts, is defined to be the amount of time that passes between when the client requests the media object and the media object commences playing out on the client's media object player. The startup latency, Ts, may include delays such as processing the client's request at the server, propagation delay in the network, and decoding and encoding delays at the client and server respectively. Halving the startup latency for a media object requires doubling the number of channels and therefore the server bandwidth requirement also doubles.

Viswanathan describes "pyramid broadcasting", which is an early data-centered protocol that greatly reduces startup latency and only requires a server bandwidth that is logarithmic in the length of the content instead of linear. A media object is partitioned into segments, where the segment size may vary. Each segment is transmitted repeatedly in a looping fashion at the same rate as the other segments, where a different channel may be used for each segment. Many other similar schemes have also been proposed to reduce the client startup latency or the maximum client temporary storage requirement for pyramid broadcasting, where the temporary storage requirement is the storage the client needs to save the data for the media object that has been downloaded at the client and not played out. If the data is saved at the client, then the storage needed is at least the size of the media object. See, e.g., C. Aggarwal, J. Wolf, and P. Yu, "A permutation-based pyramid broadcasting scheme for video-on-demand systems", *Proc. IEEE Int'l Conf. on Multimedia Systems, (Hiroshima, Japan, June* 1996); K. Hua and S. Sheu, "Skyscraper broadcasting: A new broadcasting system for metropolitan video-on-demand systems", *Proc. ACM SIGCOMM*, pp. 89–100 (Cannes, France, 1997); and L. Gao, J. Kurose, and D. Towsley, "Efficient schemes for broadcasting popular videos", *Proc. Inter. Workshop on Network and Operating System Support for Digital Audio and Video*, (July 1998). A characteristic of all these schemes is that they require that data within each segment be downloaded in order. A client therefore would have to wait for the beginning of each segment to be transmitted before beginning to download or play out the content from that segment.

U.S. Pat. No. 6,018,359 issued to Kermode (hereinafter "Kermode") describes a generalized scheme wherein a client can download multiple segments simultaneously. Kermode proposes downloading the segments starting from any point and reordering the data at the client, which allows the clients to download the segments asynchronously. The Kermode scheme and the other data-centered schemes with varying segment sizes described above, impose a restriction that each segment be downloaded at a rate that is greater than or equal to the play out rate of the content. Another restriction is that every segment is served at the same rate.

A second class of data-centered protocols fixes the size of each segment to be equal, but varies the rate that each segment is transmitted. See, e.g., L. Juhn and L. Tseng, "Harmonic broadcasting for video-on-demand service", *IEEE Trans. on Broadcasting*, 43:268–271 (September 1997) (hereinafter "Juhn97"); L. Juhn and L. Tseng, "Adaptive fast data broadcasting scheme for video-on-demand service", *IEEE Trans. on Broadcasting*, 44:182–185 (June 1998); J. -F Paris, S. W. Carter, and D. D. E. Long, "Efficient broadcasting protocols for video on demand", *International Symposium on Modeling, Analysis and Simulation of Computer and Telecommunication Systems (MASCOTS)*, vol. 6, pages 127–132 (July 1998); J. -F Paris, S. W. Carter, and D. D. E. Long, "A low bandwidth broadcasting protocol for video on demand", *Proc. International Conference on Computer Communications and Networks*, vol. 7, pages 690–697 (October 1998). Junh97 proposed an early scheme of this type, referred to as "harmonic broadcasting". Harmonic broadcasting and its variants require that the client be able to download a media object at a rate that is at least as large as the server bandwidth assigned to the media object, which grows logarithmically with the content length.

Another restriction of all the above media-on-demand schemes is that if any of the data is lost, then they either don't play back in full fidelity, or else they have to wait for a complete cycle of that segment before the missing data piece is re-sent. Either scenario is sub-optimal. As described in U.S. Pat. No. 6,307,487 (U.S. patent application Ser. No. 09/246,015, filed Feb. 5, 1999 and entitled "Information Additive Code Generator And Decoder For Communication Systems") (hereinafter "Luby I") and U.S. Pat. No. 6,320,520 (U.S. patent application Ser. No. 09/399,201, filed Sep. 17, 1999 and entitled "Information Additive Group Code Generator And Decoder For Communication Systems" (hereinafter "Luby II"), chain reaction coding is a useful method of recovering from missing data in many communications systems. Luby I and Luby II describe the application of chain reaction codes for content download, and not for an on-demand media streaming application. In some implementations of chain reaction coding, the probability of a decoder being able to decode a media object is low until the decoder has collected enough data, where enough data is approximately the size of the entire media object. Thus, it is unlikely that a media object can be decoded in parts when the encoding is applied to the entire media object as a whole.

SUMMARY OF THE INVENTION

According to one embodiment of the invention, a method of scheduling a media object for transmission between a server and a client is provided. The method comprises partitioning the media object into segments of blocks, wherein each block is a unit of media for which a client will wait to receive an entire block before playing out the block, and wherein each segment includes an integer number of blocks. The method also comprises determining one or more channels on which to serve each segment, the channels capable of carrying data between the server and the client, and determining a rate at which to serve each segment. The method further comprises determining a schedule pair for each channel, the schedule pair including a time at which the client may start receiving on the channel and a time at which the client may stop receiving on the channel.

In another embodiment of the invention, a system for scheduling a media object for transmission between a server and a client is provided. The system includes a module for partitioning the media object into segments of blocks, wherein each block is a unit of media for which a client will wait to receive an entire block before playing out the block, and wherein each segment includes an integer number of blocks. The system additionally inlcudes a module for determining one or more channels on which to serve each segment, the channels capable of carrying data between the server and the client, and a module for determining a rate at which to serve each segment. The system further includes a module for determining a schedule pair for each channel, the schedule pair including a time at which the client may start receiving on the channel and a time at which the client may stop receiving on the channel.

In another aspect of the invention, a method of serving a media object is provided. The method comprises receiving segments of a media object, wherein each segment includes an integer number of blocks, wherein each block is a unit of media for which the client will wait to receive an entire block before playing out the block, and wherein each block includes one or more input symbols. The method also comprises, for each segment, receiving an indication of one or more channels on which to serve the segment and, for each segment, receiving a rate at which to serve the segment. The method additionally comprises determining an order in which to encode blocks. The method further comprises generating output symbols for each block in the order, and transmitting the output symbols on the corresponding one or more channels, wherein each segment is served at the corresponding rate.

In yet another embodiment of the invention, an apparatus for serving a media object is provided. The apparatus includes a block encoder coupled to receive segments of a media object, wherein each segment includes an integer number of blocks, wherein each block is a unit of media for which a client will wait to receive an entire block before playing out the block, and wherein each block includes one or more input symbols. The block encoder includes an input to receive an order in which to encode the blocks, and wherein the block encoder is configured to generate, in the order, output symbols for each block. The apparatus additionally includes a transmitter coupled to receive the output symbols from the block encoder, and coupled to receive, for each segment, an indication of one or more channels on which to serve the segment and a rate at which to serve the segment. The transmitter is configured to serve the output symbols on the corresponding one or more channels at the corresponding rate.

In yet another aspect of the invention a method of receiving a media object that includes segments of blocks, wherein each segment includes an integer number of blocks, and wherein each block is a unit of media for which a client will wait to receive an entire block before playing out the block is provided. The method comprises receiving a media object description of the media object, and joining and leaving each of a plurality of channels according to the media object description to download the segments. The method additionally comprises reassembling the blocks in each segment, and playing the blocks out in an order after a startup latency.

In still another embodiment of the invention a system for receiving a media object that includes segments of blocks, wherein each segment includes an integer number of blocks, and wherein each block is a unit of media for which a client will wait to receive an entire block before playing out the block, is provided. The system includes a module for handling input of a media object description of the media object, and a module for handling channel joins and channel leaves for each of a plurality of channels according to the media object description, wherein the channels are capable of use for downloading the segments to the client. The system also includes a module for reassembling the blocks in each segment, and a module for playing the blocks out in an order after a startup latency.

Advantages of the present invention include providing improved scheduling of media objects that are to be served to clients so that the clients may play out the media objects uninterrupted after a startup latency. Advantages also include improved serving of media objects to clients. Advantages further include improved receiving of media objects served by a server.

A further understanding of the nature and the advantages of the inventions disclosed herein may be realized by reference to the remaining portions of the specification and the attached drawings.

DESCRIPTION OF THE SPECIFIC EMBODIMENTS

Figure 1:
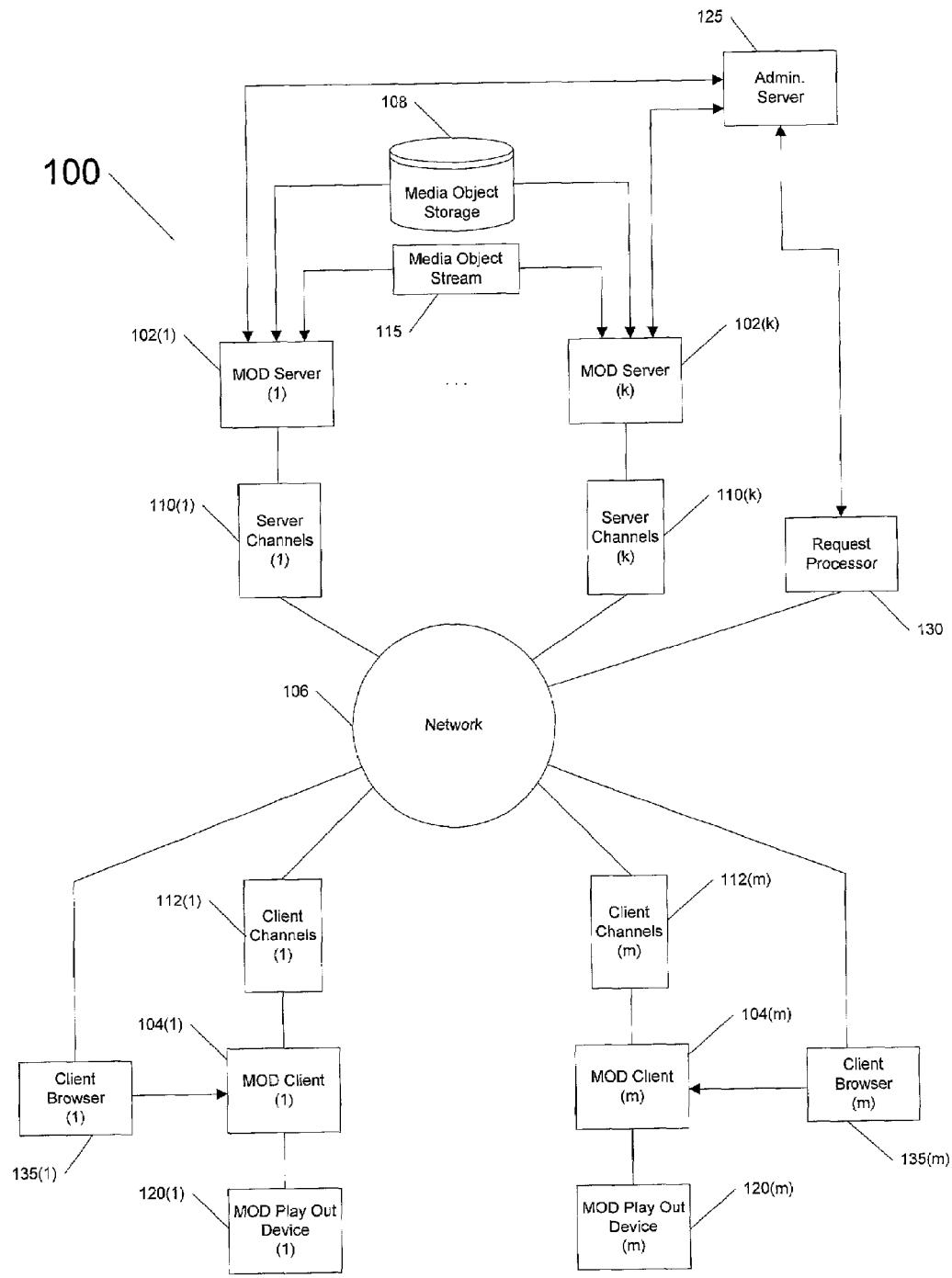
FIG. 1 is a block diagram of a MOD system with k servers and m clients according to one embodiment of the present invention.

The present disclosure references the following applications, the entire disclosures of which are herein incorporated by reference for all purposes:

(1) U.S. Pat. No. 6,307,487 (U.S. patent application Ser. No. 09/246,015, filed Feb. 5, 1999 and entitled "Information Additive Code Generator And Decoder For Communication Systems") ("Luby I");

(2) U.S. Pat. No. 6,320,520 (U.S. patent application Ser. No. 09/399,201, filed Sep. 17, 1999 and entitled "Information Additive Group Code Generator And Decoder For Communication Systems" ("Luby II");

(3) (U.S. patent application Ser. No. 09/587,542, filed Jun. 1, 2000 and entitled "Dynamic Layer Congestion Control for Multicast Transport" (hereinafter "Dynamic Layering Application");

(4) U.S. Pat. No. 6,486,803 (U.S. patent application Ser. No. 09/668,452, filed Sep. 22, 2000 and entitled "On Demand Encoding With a Window" (hereinafter "Windowing Application");

(5) U.S. Pat. No. 6,411,223 (U.S. patent application Ser. No. 09/691,735, filed Oct. 18, 2000 and entitled "Generating High Weight Encoding Symbols Using a Basis" (hereinafter "High Weight Application"); and (6) U.S. Provisional Patent Application No. 60/248,443, filed Nov. 13, 2000 and entitled "Scheduling Multiple Files on a Single Server" (hereinafter "Scheduling Multiple Files Application").

The above-referenced applications provide teachings of systems and methods that may be employed in certain embodiments according to the present invention. It is to be understood that these systems and methods are not required of the present invention, and many other variations, modifications, or alternatives may also be used.

A MOD system may be constrained by available resources such as the total network bandwidth available to the MOD system, the client download rate or the total number of channels (or multicast groups, where a multicast network is used) available to the client or the server.

In a true MOD system, the only delay that a client will experience after a request is made for a media object is the propagation delay before the first data of the media object arrives. In practical MOD systems, a small startup latency at the client is permitted in order to make the system scalable, more reliable and reduce the amount of required system resources.

In some cases, the client or the network between the server and the client are more of a constraint on transmission of the stream. For example, the maximum rate that the client can download a media object, Rd, may be constrained by the client's link to the network. What is crucial is the relationship between the download rate Rd and the media play out rate Rp. If a personal computer user is connected to the Internet over a 56 Kbps (kilobits per second) modem line, i.e., Rd=56 Kbps, and requests a full-motion, full-resolution 4.0 Mbps (megabits per second) DVD quality video, i.e., Rp=4 Mbps, then that user might not be able to receive that video stream, and start viewing it uninterrupted without a substantial delay in which almost the entire video is downloaded. This is true regardless of the speed of the server, or how much bandwidth is available between the server and the network. Similarly, the aggregate rate at which the server can deliver data to the network may be limited by the server hardware or the available bandwidth in the network. Increasing the server's output may be extremely costly or infeasible, so using the bandwidth available at the server efficiently may be an important system constraint. The amount of bandwidth used by a particular media object at the server is defined to be Rs, i.e., the aggregate rate at which the object is being served.

A more realistic example is a play out rate Rp of 300 Kbps and a download rate Rd of 400 Kbps. In this case, an MOD system should be carefully designed to enable a client to download at a slightly greater rate than the play out rate and still experience uninterrupted play out of the media.

Another factor to consider is that even though the server bandwidth, Rs, and the maximum client download rate, Rd, may be fixed for a particular media object, the actual rate that a client may download the media object can vary over time, depending, for instance, on the current point in the play out of the content, or the presence of congestion in the network.

For any MOD system, the number of channels available for use may also be an important resource the MOD system should consider in determining how to serve a set of media objects efficiently. In a multicast network, the number of multicast groups available to the server, g, could be limited due to server or network administrative reasons such as the memory required to maintain a list of multicast groups, or the number of joins and leave messages the server and the network routers can handle. Similarly, the number of multicast groups, r, that the client is actively joined to at once may be limited due to constraints imposed by the system design, memory limitations, or the processing power of the network interface card (NIC) at the client.

Partitioning a Media Object into Blocks and Segments

A media object file may be divided into sequentially numbered blocks, where the block index indicates the temporal position of each block in playing out the media object. As used herein, "media object" refers to data representing some media content where the size of the data is defined and "media stream" refers to data representing some media content where the size of the data is open-ended. An example of the former is a 60 minute video encoded at a rate of 4 Mbps and an example of the latter is a live streaming video feed. Unless otherwise indicated, it should be assumed herein that what is described with reference to media objects can also be used with reference to media streams and vice versa.

In the present invention, a block may be treated as the fundamental unit of play out in the system, in that the client cannot play out any of the content associated with a block until the entire block is received at the client. In one embodiment, for instance for video content, a block could be a single video frame and the sound associated with that frame. In another embodiment, a block could be a minute of compressed video. The size of each block may be varied. One or more blocks are grouped together to form a segment. In one embodiment, each segment includes only one block. If each segment is transmitted on a separate channel, or set of channels, then a client can join and leave channels such that the client downloads the segments in some order. The client can also reassemble and view the media object from the beginning, while other segments are still arriving.

The client stores the packets for a block as they arrive and waits for the entire block to arrive before playing it out. There need not be a time that is global to all clients associated with each block, at which the client starts downloading or playing out the block. Each client can initiate the session at any point in time, and time may then be measured for each client relative to when it initiated the session. In embodiments of the MOD scheme, each client experiences the same startup latency. Similarly, the resources required for each client may be identical and predictable, and may be based on the size and rate that each block is being served. Thus, the global time at which a particular client starts downloading or playing out a block may be particular to when it initiated the download of the media object or stream, but the experience of each client may be the same relative to when it initiated the session.

The transmission of the segments from the server to the client across the channel in the present invention will be generally described in the context of a chain reaction coding system. However, it is to be understood that the invention is not limited to chain reaction coding systems. Other methods for transmitting the segments across the channel will be described in more detail below.

Luby I, Luby II, the High Weight Application, and the Windowing Application describe various chain reaction coding systems in detail. As described therein, a chain reaction encoder generates output symbols from input symbols of the input file as needed. Luby I, Luby II, the High Weight Application, and the Windowing Application define and describe various concepts relating to chain reaction coding, and those teachings are incorporated by reference herein rather than restating them here in their entirety. Generally speaking, Luby I, Luby II, the High Weight Application, and the Windowing Application teach how to make and use a chain reaction coding encoder and decoder to transport data, including a process for generating an output symbol or a group of output symbols from selected input symbols.

Luby I, Luby II, the High Weight Application, and the Windowing Application generally describe chain reaction coding systems for an entire input file. In the present invention, the file, or media object, is broken into blocks, where each block may be encoded and decoded independently using a chain reaction encoder and decoder, respectively. In some implementations of chain reaction coding, the size of each block determines the efficiency of the chain reaction encoder and decoder. Generally, there is a trade off between the overhead and the encoding/decoding speed. For a fixed number of symbols, generally the encoding/decoding speed (in Mbps) increases as the symbol size increases. However, the amount of overhead, i.e., the number of extra output symbols that the decoder should collect greater than the block size, is proportionately smaller for larger blocks. To minimize the required overhead the blocks should therefore be as large as possible. Hence, for a fixed block size, increasing the symbol size improves encoding/decoding speed at the cost of overhead performance. One approach is to set the block size (which may be variable) to match the smallest unit of media object that can be played out by the client or transmitted by the server.

It should be understood that in different contexts in this specification, references are made to variables that stand for indefinite numbers and where different variables are used in different contexts, those numbers need not be the same.

Basic System Overview

FIG. 1 shows an exemplary MOD system 100. As illustrated there, MOD servers 102 serve media objects to MOD clients 104 over a network 106. As shown, MOD system 100 includes k MOD servers and m MOD clients, but the actual values for k and m are not particularly relevant to this description. In the preferred embodiment, network 106 is the Internet, but other networks or subsets of the Internet can be used as well, such as intranets, virtual private networks, LAN's, WAN's, wireless or satellite networks. In fact, network 106 need not be a network in the strictest sense of the term, but may be a collection of point-to-point connections.

However configured, MOD servers 102 receive requests for media objects from MOD clients 104. In FIG. 1, an administrative server 125 may determine a schedule of which media objects are available. The administrative server 125 may also maintain a list of MOD clients 104 that are eligible to download a particular media object. For instance, in a pay-per-view system, the administrative server 125 may maintain a list of MOD clients 104 that have paid and are currently eligible to download and/or view a particular media object. The administrative server 125 also may control the MOD server 102, and may determine a schedule of which MOD servers will serve a particular media object, or portion of a media object. A list of media objects currently available for download and any other parameters required by the MOD client 104 may be published by the administrative server 125 at the request processor 130. For instance, the request processor 130 may publish the play out rate, cost, length, and schedule of availability of each media object currently being served by the MOD servers 102. The MOD server 102, administrative server 125 and request processor 130 may reside on a single machine, separate machines, or some combination thereof.

Only one administrative server 125 and request processor 130 are shown, but it should be understood that other configurations are possible. For instance, in one embodiment each MOD server 102 may be associated with an administrative server 125 and/or request processor 130. In another embodiment, a subset of MOD servers 102 may be associated with the same administrative server 125 and/or request processor 130. For example, all the MOD servers 102 in one location may be associated with a single administrative server 125. Alternatively, all the MOD servers 102 serving the same media object or set of media objects may be associated with the same administrative server 125. In another embodiment, two or more request processors 130 may be associated with a single administrative server 125. For instance, one administrative server 125, may have one request processor 130 for each different type of media object that is available to different classes of MOD clients 104. Similarly, one request processor may be associated with multiple administrative servers 125.

The media objects may be stored in media object storage 108, but may also be a media object stream 115 fed to MOD servers 102 from other sources as needed. Only one media object storage 108 and media object stream 115 is shown, but it should be understood that other configurations are possible. For instance, in one embodiment each MOD server 102 may be connected to a different media object storage 108 and/or media object stream 115. In another embodiment, a subset of MOD servers 102 may be fed by the same media object storage 108 and/or media object stream 115.

The MOD client 104, may obtain a list of media objects available using a client browser 135. The client browser 135 may obtain the list of media objects from the request processor 130 via the network 106. Note that the channel used by the client browser 135 may be the same physical channel used by the MOD client 104. Once the client browser 135 requests a particular media object from the request processor 130, the client browser 135 may download a media object description from the request processor 130 which contains information necessary for the client to begin downloading the media object. For example, the media object description may include the length, play out rate, startup latency and download rate of the media object as well as the location of the MOD server or servers that are currently serving the media object For instance, in a multicast network, the media object description may contain a list of multicast groups and the relative time at which the client should join each multicast group. The client browser 135 may send the media object description to the MOD client.

In one embodiment, the client browser 135 may be a web browser, which receives the schedule using an http or a similar request from the request processor 130, which may include a web server. However, this is not the only way a client may hear an announcement of an MOD session. In another embodiment, the request processor 130 may continuously advertise, on a dedicated set of channels, which MOD sessions are available and the relevant information required by the client to join to them. The client browser 135 may maintain a permanent list of available MOD sessions or just listen to the channel to see what is available based on a user request.

For the purposes of describing some of the system constraints, the connection between a MOD server 102($i$) and network 106 may be modeled as a plurality of server channels 110($i$) and the connection between a MOD client 104($i$) and the network 106 may be modeled as a plurality of client channels 112($i$). The server channels 110 and client channels 112 may be physical and/or logical channels. In one embodiment, the MOD client 104 and MOD server 102 may be connected via a multicast network. A server may send all packets destined for a particular logical channel to a particular multicast group. The client may join and/or leave a particular logical channel by joining and/or leaving the particular multicast group. A join or a leave message propagates through the network towards the server up to the first router that can service the request. The multicast network may make sure that packets sent to multicast group are received by all the joined clients. In another embodiment, the MOD client 104 and MOD server 106 may be connected via a unicast network. The server may send all the packets destined for a particular logical channel to a particular unicast address and a particular port of a server. The client may join a particular logical channel by sending a request to receive any packets received by a particular server on a particular port address. The server may make sure that all packets received on a particular port address are copied and sent to all clients that have sent request messages to receive such packets, and thus the server may be an active agent in making the bindings between the logical channel and the physical channels. In another embodiment, the MOD server 102 may be connected to the MOD client 104 via a broadcast network, such as a satellite network and the MOD client 104 may either adjust its receiver to receive a particular subset of physical channels or receive a single physical channel and filter out the data except for a particular subset of logical channels, or a combination thereof. In one direction the physical channel may be the satellite uplink from the MOD server 102 to the network, while the client channel may be a terrestrial link to a local switch in the network. Similarly, the server channels 110 from the network 106 to the MOD server 102 may be terrestrial links, while the server channels 110 from the MOD server 102 to the network 106 may be satellite based. Unless otherwise indicated, where multicasting is referred to herein as a mechanism for scaling the required server and network bandwidths, it should be understood that broadcasting could be used as well.

The logical channels are each shown as bidirectional. Requests may flow from MOD clients 104 towards MOD servers 102, media objects may flow from media object storage 108 to MOD servers 102, served media data may flow from MOD servers 102 to MOD clients 104 and media objects to be played out may flow from MOD clients 104 to their associated MOD play out devices 120. Examples of play out devices may include televisions, music-playing devices, computer processors (where the media is to be operated upon by computers as opposed to being viewed by users), or software running on a general purpose computer (e.g., media player plug-ins or client software).

A Basic MOD System

In one embodiment, a single MOD server 102 may serve one or more media objects to any number of clients. In another embodiment, a single MOD server 102 may only serve a portion of a media object to any number of clients, where other MOD servers 102 serve the rest of the segments in the media object. For example, one MOD server 102 may serve the even numbered segments in a media object, and a second MOD server 102 may serve the odd numbered segments. As another example, one MOD server 102 may serve the segments in the first half of the media object, while a second MOD server 102 may serve the segments in the second half. In another embodiment, more than one MOD server 102 may serve the same segment in a media object. For example, two or more MOD servers 102 at different geographic locations in the network may be used to serve the entire media object, or overlapping portions of the media object concurrently. Additionally, MOD clients 104 can download from one or more of the MOD servers 102 concurrently. Multiple MOD servers 102 at the same or different locations in the network make the MOD system 100 more reliable in the event portions of the network, or some of the MOD servers 102 fail. One skilled in the art will recognize many other combinations, variations, and alternatives to the above embodiments and examples.

In one embodiment, a single MOD client 104 may receive the same or disjoint portions of a single media object from one or more MOD servers 102. For example, a MOD client 104 may download a segment of the media object from the nearest available MOD server 102, or from a MOD server among the MOD servers 102($1$-$k$) currently serving the segment with the lowest aggregate load of MOD clients 104. As another example, the MOD client 104 may decide from which MOD server 102 to download a segment based on its current reception rate of other segments from that MOD server 102. In another embodiment, the MOD client 104 may add or remove MOD servers 102 from which it is downloading in order to receive a segment. For example, a MOD client 104 may try to download a segment from a second MOD server 102 concurrently if there is congestion in the network. As another example, a MOD client 104 may download a segment from a second MOD server 102 due to failure of, lost communication with, etc., a first MOD server 102 from which it was downloading the segment.

Figure 2:
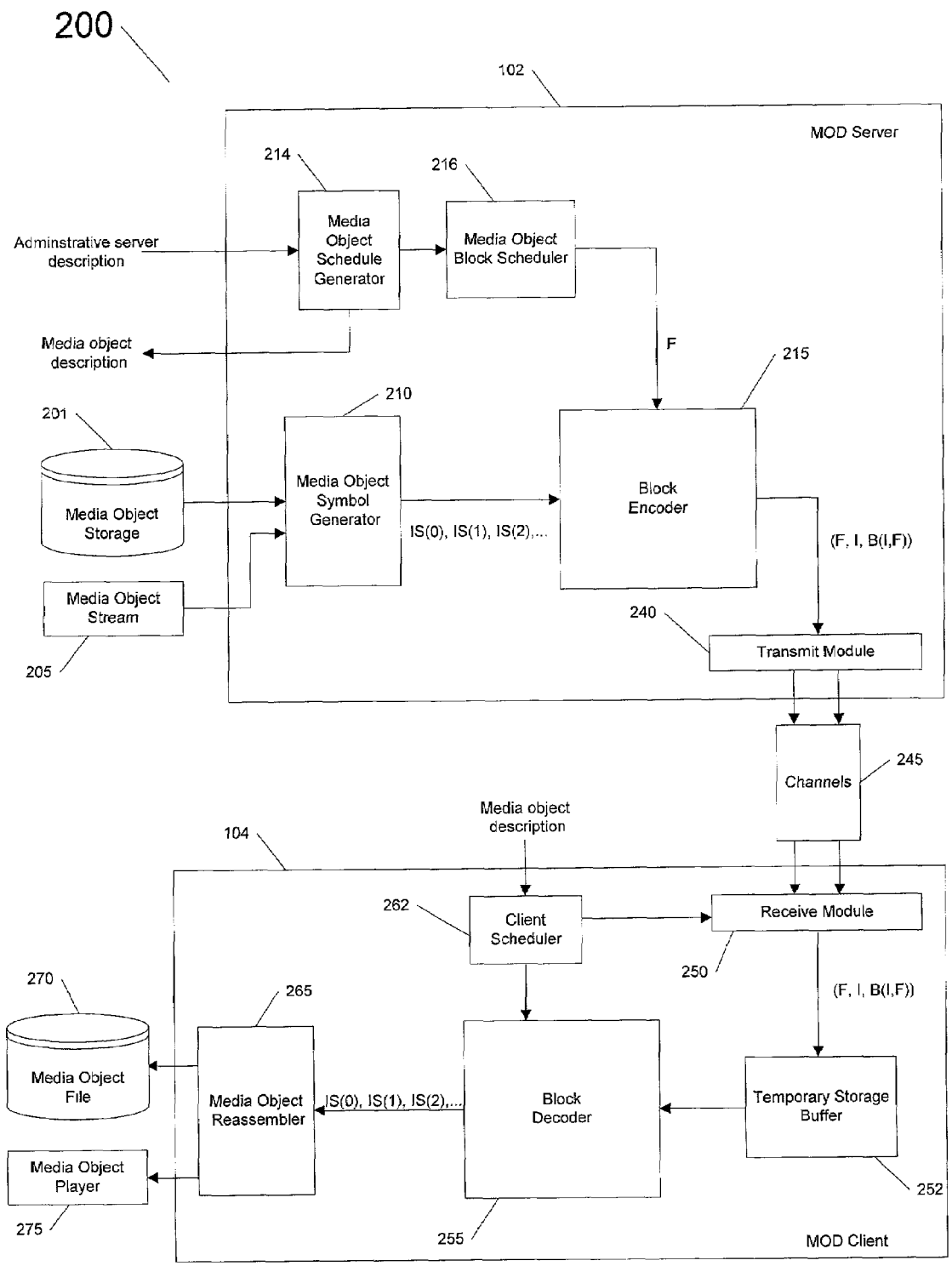
FIG. 2 is a block diagram of a MOD server with a single server and a single client according to one embodiment of the present invention.

FIG. 2 is a block diagram of a basic MOD system 200 comprising a single MOD server 102 and a single MOD client 104, connected by a plurality of channels 245. Here for simplicity the server channels 110, network 106 and client channels 112 have been combined into a single set of channels 245. As stated before, these channels may be physical channels or logical channels. In the MOD system 200, a media object residing in media object storage 201, or forming a media object stream 205, may be provided to a media object symbol generator 210. Media object symbol generator 210 may generate a sequence of one or more input symbols (IS($0$), IS($1$), IS($2$), . . . ) from the media object file or stream, with each input symbol having a value and a position (denoted in FIG. 2 as a parenthesized integer). The output of media object symbol generator 210 is provided to a block encoder 215.

The media object schedule generator 214 receives as input the administrative server description of the media object and generates a media object description for the request processor 130. In one embodiment, the functionality of the media object schedule generator 214 may be performed by the administrative server 125. One function of the media object schedule generator 214 may be to partition the media object into a set of segments, where each segment comprises one or more blocks and has an associated size, rate and set of channels to be served on. If the media object is a stream, then the media object schedule generator 214 may partition the media object as the content arrives. The rate and channel to serve each block or segment may vary over time. For instance, in a multicast network, a dynamic layering scheme may be used to serve each segment. For example, the Dynamic Layering Application describes various dynamic layering schemes that may be used. It is to be understood, however, that many other types of dynamic layering schemes may also be used. Moreover, other methods in addition to dynamic layering schemes may also be used to serve each segment.

The size, rate and set of channels to serve each segment and block of the media object may serve as the input to the media object block scheduler 216. Each segment of the media object may be logically divided into a plurality of disjoint blocks by the media object block scheduler 216. In one embodiment, the blocks may be approximately equal in size. The media object block scheduler 216 may determine how many output symbols from each block of each segment are to be generated by the block encoder 215. Each block may be identified by a unique block index F. When chain reaction codes are used, if output symbols are generated on the fly, the media object block scheduler 216 should ensure that there are enough output symbols generated for each block so that each segment can be served at the rate determined by the media object schedule generator 214. Each output symbol may be generated as a function of input symbols from a single block or subset of blocks. The block or set of blocks from which input symbols are chosen to generate an output symbol will be referred to as the blocks associated with that output symbol. In a specific embodiment, each output symbol is associated with only one block.

The block encoder 215 provides output symbols to a transmit module 240. Transmit module 240 may also be provided the key of each such output symbol and the set of blocks associated with each such output symbol. Transmit module 240 transmits the output symbols, and depending on the keying method used, transmit module 240 may also transmit some data about the keys of the transmitted output symbols, or the associated blocks, over a plurality of channels 245 to a receive module 250. Transmit module 240 may include a buffer to store output symbols, thereby allowing transmit module 240 to transmit output symbols in an order that is different from the order in which transmit module 240 receives the output symbols. Transmit module may transmit each segment on a different channel, on multiple channels, or subsets of segments on different channels.

In a specific embodiment, block encoder 215 is a chain reaction encoder as described below. Each block is encoded and decoded separately, as described in the Scheduling Multiple Files Application. Since each block or segment is sent on a separate channel, it is not necessary to collect enough symbols to decode the entire media object before decoding and hence playing out the content. For instance, in one embodiment, the blocks or segments are received and decoded in order. It is to be understood, however, that a chain reaction code need not be used, and that each block need not be encoded and decoded separately as described in the Scheduling Multiple Files Application.

The system can also be implemented with other encoders or without any encoding at all. In one embodiment, the output symbols are simply the original input symbols which are broadcast repeatedly by transmit module 240 on each channel in a looping manner. In another embodiment, the original symbols are encoded by block encoder 215 using an erasure correcting code other than a chain reaction code, such as a Reed-Solomon code or a Tornado code. These codes have a fixed number of encoded symbols so if there is sufficient storage available at the server, the block encoder 215 need only generate each output symbol once and store it, where the encoded symbols may be generated prior to the start of transmission, or as needed by the transmit module 240. The encoded symbols may then be broadcast repeatedly by transmit module 240 on each channel either in a looping manner, or by choosing a random output symbol each time. For encoded data, it is important to design the system so that a client receives a minimal number of duplicate encoded packets. The system works well using a chain reaction encoder because the client may concurrently download encoded data from multiple servers without coordination and not receive redundant data. An additional advantage of chain reaction codes is that they offer a greater amount of protection and flexibility in system design against loss compared to a code that has been designed for a fixed loss rate.

Receive module 250 receives the output symbols from the plurality of channels and determines the key I and block F associated with each output symbol. In one embodiment, the receive module may use information explicitly transmitted with each output symbol to determine the key and the block for each output symbol. In another embodiment, receive module 250 may use timing information, or information about the channel an output symbol was received on, in order to calculate the key I or the block F for that output symbol. Receive module 250 provides the output symbols and their associated block and key to a temporary storage buffer 252.

A client scheduler 262 receives the media object description from the client browser 135. The client scheduler 262 determines the time to join and leave channels, and when to have the block decoder 255 reassemble any block in its entirety, where reassemble may be defined to include decode, or just reorder in the case only the original data is sent. In one embodiment, the client scheduler 262 uses feedback from the block decoder 255 and receive module 250 in order to determine these actions. For instance, in the presence of loss, or if the client varies its reception rate by joining and leaving channels over time in the presence of congestion, the client scheduler 262 may wait for the receive module 250 to indicate that enough output symbols from a particular channel, or for a particular block, have been received before issuing a command to the receive module 250 to leave the channel, or the block decoder 255 to reassemble the block F. In another embodiment, the client scheduler 262 uses timing information from the media object description to determine which channels to join and leave and when to reassemble a block. The block decoder 255 receives a signal from the client scheduler 262 to reassemble a block. The block decoder 255 loads the block F to be reassembled from the temporary storage buffer 252, and may use the keys together with the corresponding output symbols, to recover the input symbols (again IS(0), IS(1), IS(2), . . . ). Block decoder 255 provides the recovered input symbols to a media object reassembler 265, which generates a copy 270 of the media object file 201 or media object stream 205, or feeds the reassembled media object directly to a media object player 275.

In one embodiment the MOD play out device 120 receives the reassembled media object as a stream as in the media object player 275. In another embodiment, the media object is first stored as a media object file 270, and later accessed by the MOD play out device 120. The MOD play out device 120 may wait for the entire media object to be reconstructed before beginning the play out, or just a portion of it, for instance, the first block or segment.

A Basic Block Encoder

Figure 3:
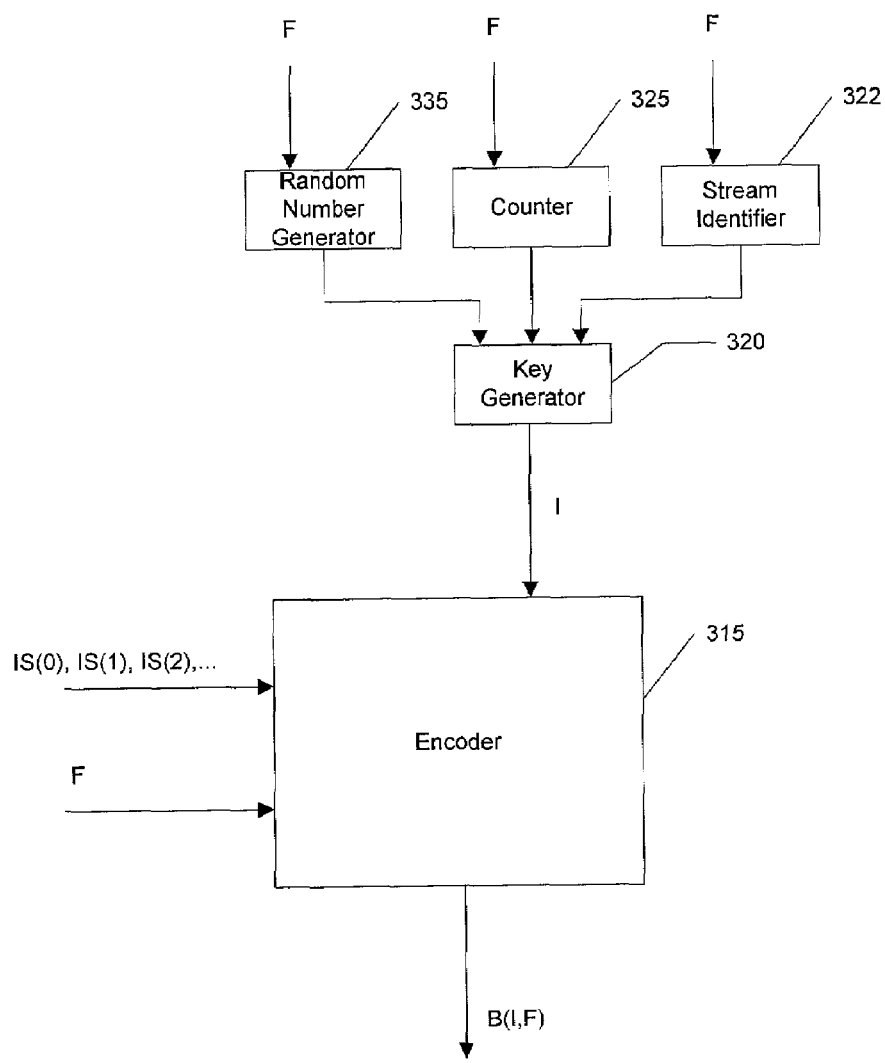
FIG. 3 is a block diagram of a block encoder as may be used in the MOD system shown in FIG. 2.

FIG. 3 shows a basic block encoder 215 for an MOD system using chain reaction codes. The block encoder 215 comprises a random number generator 335, counter 325, stream identifier 322, key generator 320 and encoder 315. Key generator 320 generates a key for each output symbol to be generated by encoder 315. Key generator 320 may use a combination of the output of a counter 325, a unique stream identifier 322, and/or the output of a random number generator 335 to produce each key. The counter 325, random number generator 335 and stream identifier may all have a block index F as input. In one embodiment, each key may be generated independently of the block for which encoder 315 is to generate an output symbol, and the same key may be used on multiple different blocks. However, it is to be understood that the same key need not be used on multiple different blocks. The output of key generator 320 is provided to the encoder 315. Using each key I provided by key generator 320 and block index F, the encoder 315 generates an output symbol, with a value B(I,F). The value of an output symbol is generated based on its key and on some function of one or more input symbols in the block F provided by the media object symbol generator 210. In one embodiment, a heavy weight basis is associated with each block so that output symbols of large weight may be generated more efficiently. The High Weight Application provides further details on generating output symbols using a basis. It is to be understood, however, that many other methods of generating large weight symbols using a basis. Moreover, many other methods may be used to generate large weight symbols. The input symbols used in generating an output symbol are referred to herein as the output symbol's "associated input symbols".

Figure 4:
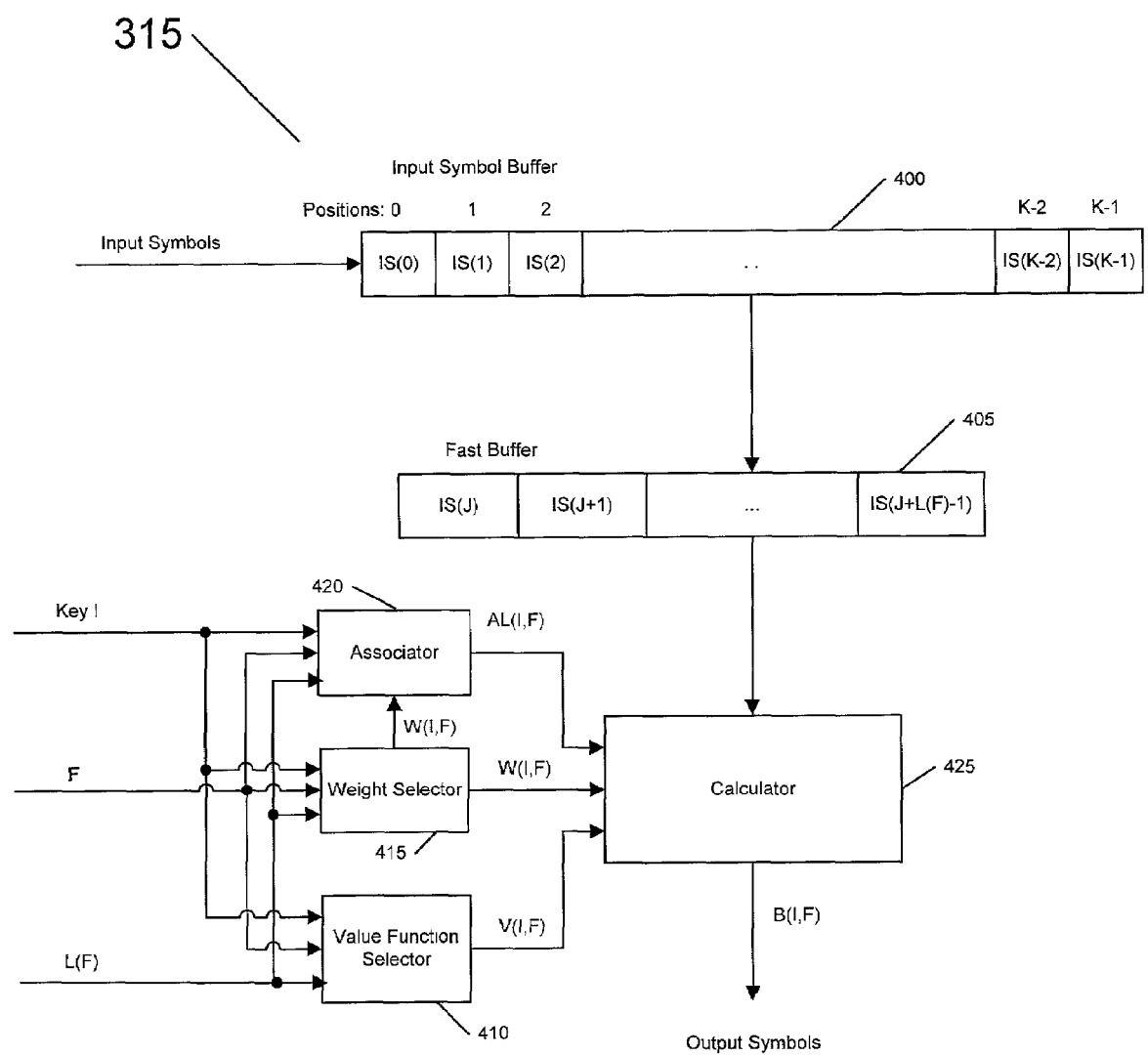
FIG. 4 is a block diagram of an encoder as may be used in the block encoder shown in FIG. 3.
Figure 5:
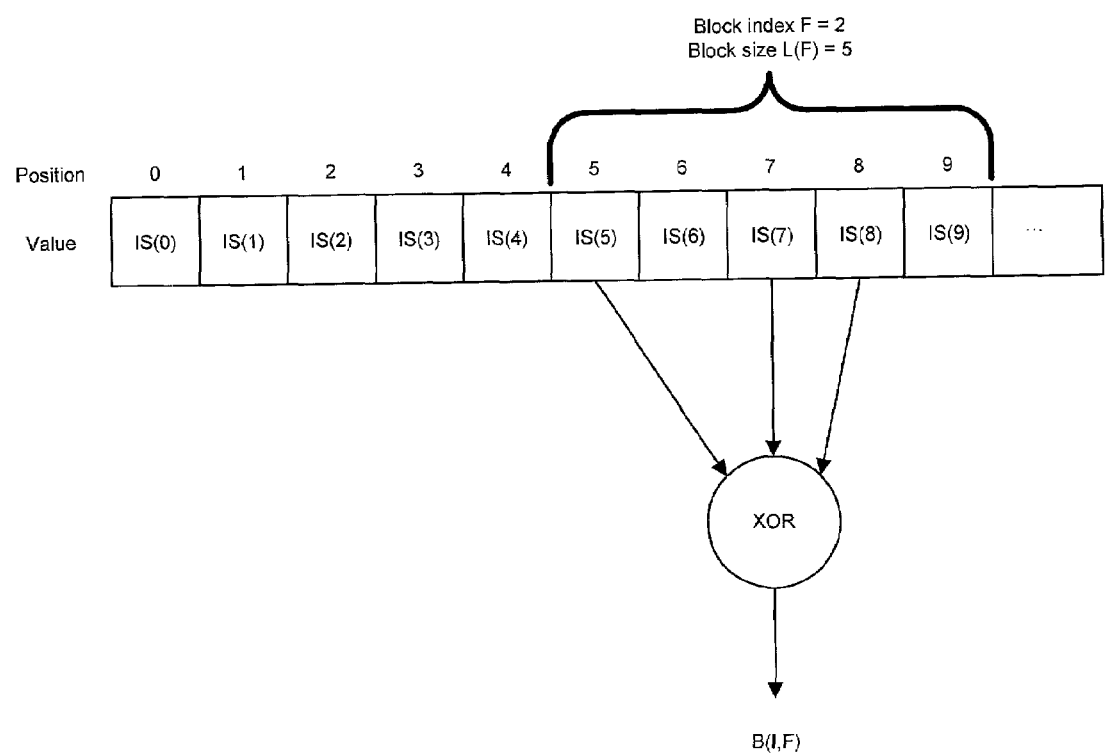
FIG. 5 is an illustration of how an output symbol may be generated from a set of associated input symbols.

FIG. 4 is a block diagram of one embodiment of block encoder 315 shown in FIG. 3. The block diagram of FIG. 4 is explained herein with references to FIG. 5, which is a diagram showing the logical equivalent of some of the processing performed by the encoder shown in FIG. 4.

Block encoder 315 is provided with input symbols from a fast buffer 405 and input symbol buffer 400 and a key I and a block F for each output symbol it is to generate. As shown, L(F) input symbols in order of position are stored in fast buffer 205, where L(F) is the number of symbols in block F and the first input symbol in block F occurs at position J. Also, while the size L(F) of the block is expressed here as a function of the block index F, it should be understood that in some variations, L(F) is fully determinable from the block F while in other variations L(F) is a function of other values as well, or is independent of F. In one embodiment L(F) is the same for all the blocks.

The input symbols may be read as needed from the input symbol buffer 400 into the fast buffer 415. In a specific embodiment, fast buffer 405 would be a storage medium with a faster access time than input symbol buffer 400. For example, fast buffer 405 may be implemented in RAM while input symbol buffer 400 is stored in disk storage. In this embodiment, as many as possible of the input symbols should be in fast buffer 405 when the calculator 425 is invoked, balancing the time savings of invoking the calculator 425 when many symbols are in fast buffer 405 with the time it takes to move input symbols from the input symbol buffer 400 to fast buffer 405.

Key I (provided by key generator 320 shown in FIG. 3) and block F (provided by media object block scheduler 216 shown in FIG. 2) are inputs to value function selector 410, weight selector 415 and associator 420. The number of input symbols L(F) in block F may also be provided to these three components 410, 415 and 420. A calculator 425 is coupled to receive outputs from value function selector 410, weight selector 415, associator 420, input symbol buffer 400 and the fast buffer 405, and has an output for output symbol values. It should be understood that other equivalent arrangements to the elements shown in FIG. 4 may be used, and that this is but one example of an encoder according to the present invention.

Using I, F, and possibly L(F), weight selector 415 determines the number W(I,F) of input symbols that are to be "associates" of the output symbol having key I. In one variation, W(I,F) is chosen based on I but is not based on F. Once the number W(I,F) is determined, weight selector 415 supplies the number to associator 420 and to calculator 425 if needed.

Using I, F, W(I,F) and possibly L(F), associator 420 determines a list AL(I,F) of the W(I,F) positions of input symbols selected among the L(F) symbols in block F to be associated with the current output symbol. It should be understood that W(I,F) need not be separately or explicitly calculated if associator 420 can generate AL(I,F) without knowing W(I,F) ahead of time. Once AL(I,F) is generated, W(I,F) can be easily determined because it is the number of associates in AL(I,F). It should also be understood that not all the input symbols used by the calculator need be in fast buffer 405, as some or all of the input symbols may be obtained from input symbol buffer 400. Preferably, as many input symbols as possible can be obtained from the fast buffer 405.

Once I, W(I,F) and AL(I,F) are known and available to calculator 425, then calculator 425 accesses the W(I,F) input symbols referenced by AL(I,F) in fast buffer 405, or in input symbol buffer 400 if the needed input symbols are not present in fast buffer 405, to calculate the value, B(I,F), for the current output symbol. Calculator 425 calculates the value B(I,F) of the output symbol being calculated based on a value function V(I,F), if a variable value function is used. One property of a suitable value function is that it would allow the value for an associate in AL(I,F) to be determined from output symbol value B(I,F) and from the values for the other W(I,F)−1 associates in AL(I,F). One preferred value function used in this step is the XOR value function, since it satisfies this property, is easily computed and easily inverted. However, other suitable value functions may be used instead. Luby II describes, for instance, a system in which a group of output symbols are generated using a Reed-Solomon value function. Moreover, Luby II describes other value functions that may also be used, including methods based on polynomials over finite fields, methods based on linear systems of equations, methods based on Cauchy matrices over finite fields, and other MDS codes (of which Reed-Solomon codes are examples).

If used, value function selector 410 determines a value function V(I,F) from key I, and possibly F and L(F). In one variation, the value function V(I,F) is the same value function V for all I and F. In that variation, value function selector 410 is not needed and calculator 425 can be configured with the value function V. For example, the value function may be XOR for all I, i.e., the output symbol value is an XOR (exclusive OR) of the values of all of its associates.

Block encoder 315 then outputs B(I,F). In effect, block encoder 315 performs the action illustrated in FIG. 5, namely, to generate an output symbol value B(I,F) as some value function of selected input symbols. In the example shown, the value function is XOR, the weight W(I,F) of the output symbol is 3, the block starts at position J=5, the size L(F) of the associated input symbols (the associates) are at positions 5, 7, and 8 and have respective values IS(5), IS(7) and IS(8). Thus, the output symbol is calculated as B(I,F)=IS(5) XOR IS(7) XOR IS(8) for that value of I and F.

In some embodiments, the number L(F) of input symbols in block F is used by the encoder 315 to select the associates. The value L(F) may also be used by the encoder 315 to allocate storage for input symbols. Where the input is a streaming file, a windowing encoder such as, for example, the windowing encoder described in the Windowing Application may be used to encode the block. It is to be understood, however, that the many other types of windowing encoders may also be used. Moreover, other methods in addition to windowing may additionally be used to encode the block.

As described above, the media transmitted from a MOD server 102 to a MOD client 104 is preferably encoded using chain reaction coding. In one embodiment, the coding can be done ahead of time, in which case the encoded output symbols for the media object could be stored in a storage buffer in transmit module 240. In a preferred embodiment, the encoding can be done by the MOD servers 102 on the fly, with the block encoder 215 continuously generating new output symbols at the appropriate rate for each block. The operation of several variations of a chain reaction coder 214 are described in detail in Luby I, Luby II, the High Weight Application, and the Windowing Application and rather than describe those in great detail here, those references are incorporated herein.

A Basic Receive Module

Figure 6:
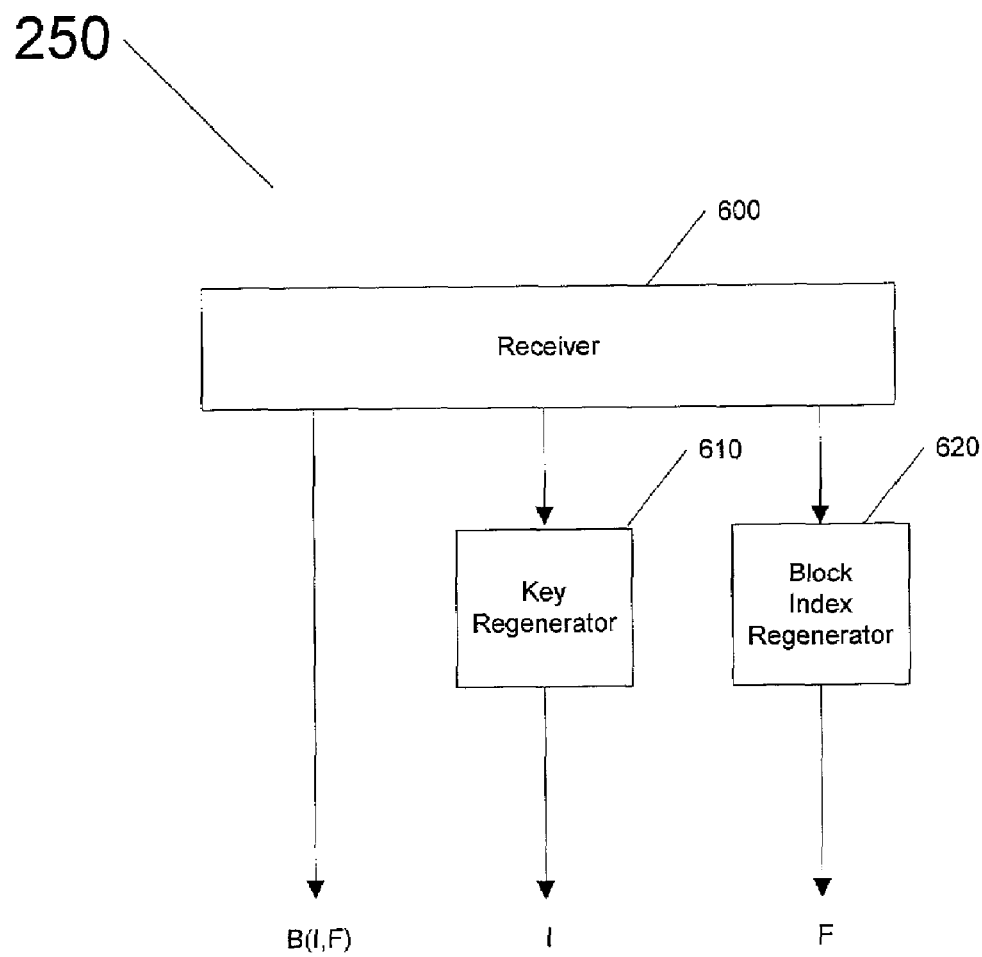
FIG. 6 is a block diagram of a receive module as may be used in the MOD system shown in FIG. 2.

FIG. 6 shows a basic receive module 250 from FIG. 2. The receive module 250 comprises a receiver 600, a key regenerator 610 and a block index regenerator 620. Receiver 600 processes the data received on the channels 245 and provides the output symbols to a temporary storage buffer 252. Data that receiver 600 receives about the keys of these output symbols is provided to a key regenerator 610, and data that receiver 600 receives about the block index is provided to a block index regenerator 620.

Key regenerator 610 regenerates the keys for the received output symbols and provides these keys to temporary storage buffer 252. Block index regenerator 620 regenerates the block index for the received output symbols and provides these block indices to temporary storage buffer 252. In one embodiment, temporary storage buffer 252 will store all the output symbols from the same block in a contiguous portion of the buffer. For instance, for a media object comprising n blocks, the temporary storage buffer will contain n disjoint portions of contiguous buffer space, where output symbols from a particular block are stored in buffer space reserved exclusively for that block. In another embodiment, the buffer space for a block may be reused once that block has been processed by the block decoder 255 in order to conserve the amount of temporary storage buffer 252 required.

A Basic Client Scheduler

Figure 7:
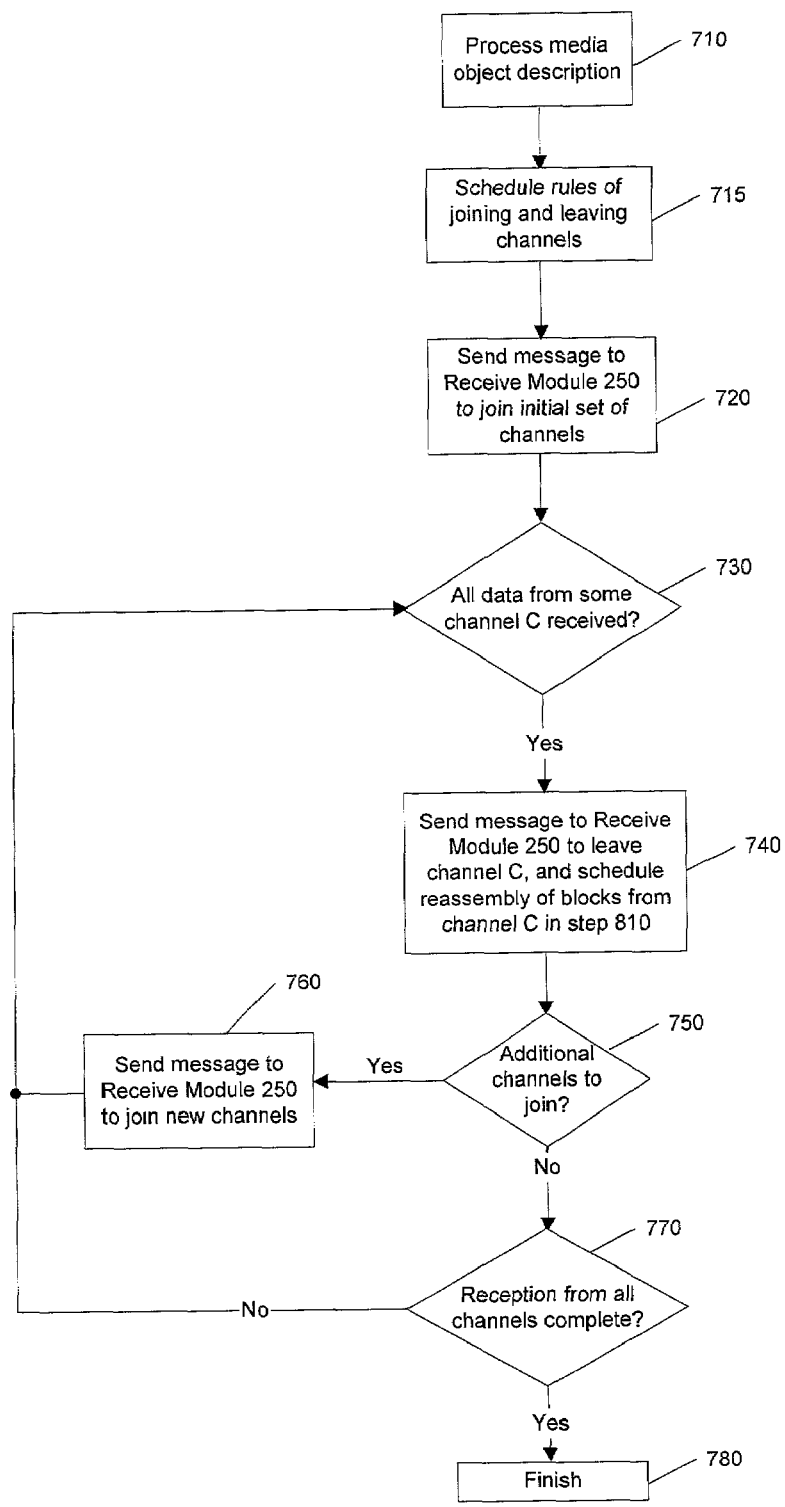
FIG. 7 is a simplified flow diagram of a process that may be used by the client scheduler shown in FIG. 2, to determine the time to join and leave channels, and when to reassemble all the blocks received on a channel.
Figure 8:
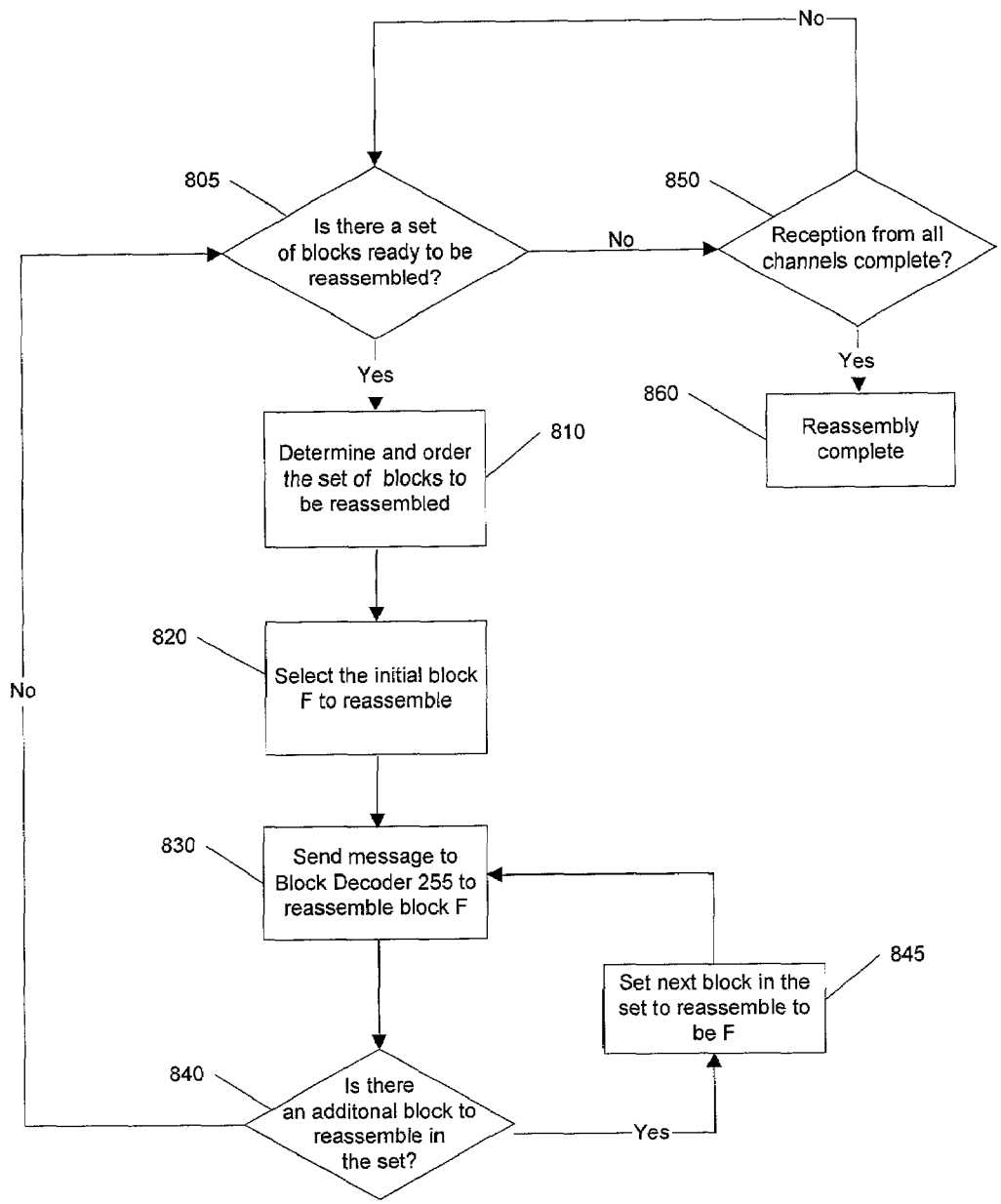
FIG. 8 is a simplified flow diagram of a process that may be used by the client scheduler shown in FIG. 2, to determine when to reassemble each block.

FIGS. 7 and 8 are simplified flow diagrams of a method according to an embodiment of the invention that may be implemented to control the actions of the client such as, for example, the client scheduler 262 shown in FIG. 2. These diagrams are merely for illustrative purposes and are not intended to limit the scope of the claims herein. FIGS. 7 and 8 are a high-level flow diagram of a method for controlling the actions of the client so that the client can download the media object and play it out uninterrupted. FIG. 7 is an embodiment of a process that the client scheduler 262 may use to determine which channels to join and leave and when to perform these actions. FIG. 8 is an embodiment of a process that the client scheduler 262 may use to determine when to reassemble each block. First, in a step 710, the media object description is processed. The media object description may include the order to join each channel, the size of the segment or segments and the rates the segment or segments are served on each channel, and the time at which to join and leave each channel. In one embodiment, the media object description may be simply a list of channels to join, where the list is organized so that each time a segment completes downloading on a channel, the client scheduler 262 will leave that channel and join a new set of channels specified on the list. For example, if the client only receives data on a single channel at a time, the media object description may just be the list of the channels to join in order. In another embodiment, the media object description includes the list of channels, the segment and the size of the segment associated with each channel. The media object description may also include a security key for each channel and/or the entire media object, which the client needs in order to reassemble the received blocks on each channel. Note that only a subset of these may be sufficient for the client scheduler 262 to determine which channels to join and when to join them.

Next, in a step 715, the client scheduler 262 determines the rules of joining and leaving the channels according to the media object description. These rules may specify, for example, when a client may join and/or leave a channel, the number of channels to join at any particular time and/or time period, the order in which to join and/or leave channels, etc. In one embodiment, the client may only leave a channel when the segment completes downloading on that channel. In another embodiment, the client may join and leave the same channel more than once before a segment completes downloading on that channel. For example, the client may join one or more channels to increase its reception rate if, for example, it does not experience congestion, and leave one or more channels to decrease its reception rate if, for example, it does experience congestion.

As described above, the order in which to join and/or leave channels may be defined according to the media object description. Therefore, in certain embodiments in which the client joins and/or leaves channels as a function of congestion, the client may, for example, join and leave channels in a stack-like manner according to congestion (e.g., losses) experienced during the download. For instance, if the client is not experiencing congestion, it may join the next channel in the specified order to which it has not yet joined, or re-join a channel that it had last dropped. Similarly, the client may drop channels from which it has completed downloading, and may also drop the most recently joined channel if the client does experience congestion. Thus, the client may join or drop channels in response to a level of congestion, and the reception rate at the client oscillates accordingly. An average reception rate should be maintained in order to guarantee that the client will be able to play out the media object without interruption.

In step 720, the client scheduler 262 sends a message to receive module 250 to join the initial set of channels determined in 715. The client scheduler 262 then waits for a message from the receive module 250 to indicate that all the data from one of the channels C has been received. When all the data for a segment on channel C has been received, in a step 740, the client scheduler 262 sends a message to receive module 250 to leave channel C and schedules the reassembly of the blocks from channel C as shown in FIG. 8. If there are additional channels to join at this time, the client scheduler 262 sends a message to receive module 250 to join the appropriate channels in steps 750 and 760. If there are no more channels to join at this time, in step 770 the client scheduler checks if there are any segments that have not completed downloading, or if there are more channels to be joined at a later time. If there are still segments to be downloaded, or channels to be joined in the future, then the client scheduler returns to step 730, otherwise the media object has completed downloading (step 780).

In another embodiment, the client scheduler may use timing information to determine when to join and leave channels and may join and leave channels at times other than when the reception for a channel has completed. For example, a new channel may be joined if some fraction of a segment on another channel has completed downloading, or if some amount of time has passed.

FIG. 8 is a simplified flow diagram of a method according to an embodiment of the invention that may be implemented to reassemble a segment or set of segments downloaded on a channel C. The flow diagram in FIG. 8 is initiated by a call from step 740 in FIG. 7 when the client scheduler 262 is ready to reassemble the blocks received on some channel C. First, in a step 805, the client scheduler 262 determines if there is a set of blocks available that is ready to be reassembled. If there is a set of blocks available, then in step 810 the client scheduler 262 determines and orders the set of blocks to be reassembled. Then, in steps 820 and 830, the client scheduler 262 selects the first block F to be reassembled, and sends a message to the block decoder 255 to reassemble block F. The client scheduler 262, then loops through the set of additional blocks from which to reassemble until all the blocks have completed reassembly in steps 840 and 845. Once all the blocks in the set have been reassembled, the client scheduler 262 returns to step 805. If there is no new set of blocks ready to be reassembled, then, in a step 850, the client scheduler 262 performs the same check as in step 770 of FIG. 7, to determine if there are any segments that have not completed downloading, or if there are more channels to be joined at a later time. If there are still segments to be downloaded, or channels to be joined in the future, then the client scheduler returns to step 805 and waits for the next channel to complete downloading and be ready to reassemble. Otherwise, the media object has completed reassembly (step 860).

In one embodiment, the block decoder 255 may reassemble a particular block in a segment before the entire segment has been received, and/or try and reassemble some or all of the blocks in a segment for which data is currently being received. In another embodiment, the block decoder 255 may reassemble a number of blocks at once, where the number of blocks may vary from client to client depending upon the system resources available to the block decoder 255. In a specific embodiment, the client scheduler 262 will schedule the reassembly of each block so that if the block decoder 255 and the media object player 275 are using the same set of system resources, the block decoder 255 will reassemble each block using the resources in a manner that will not effect the quality of the play out of the media object, while still ensuring that each block is reassembled before it is required to be played out. For instance, if the media object player 275 uses the processor at specific known intervals, then the client scheduler 262 can ensure that a block is not reassembled during those intervals.

Scheduling a Media Object According to a Set of Constraints

Several scheduling methods for the media object schedule generator 214 shown in FIG. 2 will now be described. In one embodiment, the media object schedule generator 214 may first partition each media object into a set of disjoint blocks. Then, the blocks may be grouped together to form a set of segments, where each segment comprises one or more blocks. In another embodiment, the media object schedule generator 214 may first partition each media object into a set of disjoint segments, where each segment is then partitioned into one or more disjoint blocks. Each segment is scheduled to be served on one or more channels. The size of the blocks and segments, and the rate on each channel may vary.

As shown in FIG. 2, the input to the media object schedule generator 214 is an administrative server description, and the output comprises a media object description which is sent to the client, and a set of instructions for the media object block scheduler 216 on how to serve each block.

The administrative server description comprises two parts: the media object parameters and a set of system constraints for serving the media object. The media object parameters include the size S Mbits (megabits) and the play out rate Rp Mbps of the media object. (Note that megabits is used here instead of megabytes to simplify the equations below. To convert from megabits to megabytes, divide by 8.) In one embodiment, the media object parameters include a list of positions at which it is possible to partition the media object. For example, for video content, the media object schedule generator 214 may partition the media object into frames, or sets of frames. The list may include the position in the media object at which each frame starts. As another example, the media object schedule generator 214 may be required to partition the media object into scenes. For instance, the client may want to insert commercials between the play out of different blocks, and the commercials are desired to occur only at the end of a scene.

The system constraints for serving the media object may include basic constraints such as:
1. the maximum total server bandwidth Rsmax Mbps;
2. the maximum client download rate Rd Mbps;
3. the maximum startup latency at the client Ts seconds;
4. the maximum total number of channels concurrently available to the client r;
5. the maximum total number of channels concurrently available to the server g; and
6. the maximum temporary storage available at the client Mmax Mbits.

Additional system constraints may include the minimum block size Bmin, the maximum block size Bmax, and the maximum segment size Smax. The minimum segment size is at least the minimum block size. If the maximum block size Bmax is at least twice as large as the minimum block size Bmin, then any segment can be partitioned into disjoint blocks that are all within the minimum and maximum block sizes. If the maximum block size is smaller than twice the minimum block size, then some adjustment in the sizes of the segments may be necessary in order to partition each segment into an integer number of blocks.

One constraint that normally applies to scheduling methods is that, unless the client has already downloaded the media object, or has it otherwise available, the client should receive enough data to reassemble a block in its entirety by the time the block is to be played out in the sequence. Otherwise, the client will either interrupt the play out and pause while the data is being received, or move onto the next block or segment to be played out or downloaded.

A few definitions are set out below for use in later descriptions of some of the scheduling methods. One output of the media object schedule generator 214 is a partition of the media object into n blocks, where the size of block i is b(i) Mbits. The size of the entire media object is therefore $$S = \sum_{i=0}^{n-1} b(i) \text{ Mbits.} \quad \text{(Equ. 1)}$$

Another output of the media object schedule generator 214 is a partition of the media object into n' segments, S(0), S(1), ..., S(n'−1), where segment S(i) is N(i) Mbits in size, and comprises an integer number 1(i) blocks. Segment S(i) is served on g(i) independent logical channels. Define r(i)= r(i, 0)+r(i,1)+ ... +r(i, g(i)−1), to be the aggregate serving rate for segment S(i), where r(i, C) is the rate that segment S(i) is served on the C-th such channel. If a segment S(i) is only being served on a single channel, then the download rate for S(i) is referred to here as r(i) without ambiguity. Block j in segment S(i) is served on up to g(i) channels. Define rb(j)=rb(i, 0)+rb(j, 1)+ ... +rb(j, g(i)−1), to be the aggregate serving rate for block j, where rb(j, C) is the rate that block j is served on the C-th channel for segment S(i). The aggregate rate of all the blocks being served for segment S(i) is r(i). The aggregate serving rate, i.e., the amount of bandwidth required at the server is $$Rs = \sum_{i=0}^{n-1} rb(i) = \sum_{i=0}^{n'-1} r(i) \text{ Mbps.} \quad \text{(Equ. 2)}$$

In one embodiment, the aggregate rate rb(j) for each block j in segment S(i) is the same for all the blocks in segment S(i). In one embodiment, the aggregate rate rb(j,C) for block j in segment S(i), served on the C-th channel for segment S(i) is equal to r(i,C) rb(j)/r(i) for every block in every segment. The data for the different blocks in a segment is transmitted on each channel serving that segment as described in the Scheduling Multiple Files Application. It is to be understood, however, that many other ways for transmitting data may be used in addition to methods described in the Scheduling Multiple Files Application.

Where the blocks in each segment are encoded using chain reaction codes, there is no difficulty associated with partitioning the content of a block among many channels, since a specific set, or order, of output symbols is not required, and multiple independent streams of output symbols are information additive. If the original data is transmitted across the channel, or a fixed rate FEC code is used to encode each block, then the data from the block can be partitioned and served on different channels. The fraction of the block that is served on each channel is proportional to the amount of data that the client is expected to download from that channel. In another embodiment, the same data for a block is served on more than one channel.

For each channel C serving the media object, the media object schedule generator 214 produces a pair of values (I(C), E(C)), where I(C) is the schedule time that the client first joins channel C and E(C) is the schedule time that the client leaves channel C. Both times I(C) and E(C) are given relative to the time that the client first receives data for the media object, and E(C)−I(C) is the approximate time that the client will spend downloading a segment on channel C. In one embodiment, a client downloading the media object is not required to start receiving data from channel C at time I(C) relative to the time the client first receives data for the media object. Similarly, a client downloading the media object is not required to stop receiving data from channel C at time E(C) relative to the time the client first receives data for the media object. A client is only required to minimally fulfill the schedule pair for each channel, wherein minimally fulfill means that the client receives data from the set of channels associated with a segment for a length of time sufficient to download and reassemble the entire segment before it is to be played out.

For example, consider a segment S(i) of size N(i) Mbits being served at rate r(i) Mbps, where the segment is served on a single channel C. If the segment is scheduled to start playing out at time t+E(C) at the client, the client experiences no loss, N(i)=r(i) (E(C)−I(C)), and the segment can be reassembled completely at the client once at least N(i) Mbps of data has been received, then the client minimally fulfills the schedule pair if it downloads the segment for time E(C)−I(C), wherein the time the client starts downloading the segment S(i) from channel C is less than or equal to time t+I(C). Alternatively, if the client downloads the segment on channel C for two separate time intervals, such that the total time spent downloading the segment is E(C)−I(C) seconds, and the second time interval ends before time t+E(C), then the client also minimally fulfills the schedule pair for segment S(i).

As another example, consider a client that starts downloading the segments in order, where the next segment starts downloading once one of the current segments being downloaded completes downloading. If the schedule pair is chosen so that N(i)≦r(i)·(E(C)−I(C)) for every segment S(i), the client experiences no loss, and segment S(i) can be reassembled completely at the client once at least N(i) Mbps of data has been received for the client, then the client minimally fulfills the schedule pair for each segment, without explicitly knowing any of the schedule pairs.

The media object schedule generator 214 should partition and serve the media object so that all the system constraints are satisfied. The list of instructions generated by the media object schedule generator 214 for the media object block scheduler 216 include how the media object is partitioned into blocks and segments, and a list of channels on which to serve each segment. The list may also include the rate to serve each block in each segment, or the rate to serve each block in each segment for each channel for that segment.

The media object description describes how the media object is to be partitioned and downloaded on the different channels to the client. The media object description may include a list of block and segment sizes, a list of channels for the media object, and the schedule pairs for each channel. In another embodiment, the media object description includes a schedule of the order to join the channels and how many channels to join at each time. In this embodiment, the client leaves a channel once the necessary data for that segment on that channel has been received. The client may also join and leave a channel multiple times in response to congestion in the network.

A "pseudo-segment" with index −1 may be played out during the startup latency period. That pseudo-segment can be an empty block, in which case the media object does not start playing out until the end of the startup latency period, or the pseudo-segment may be a pre-downloaded segment S(−1) that starts playing out when the client requests the media object. In this way, there is no apparent delay at the client. One possible implementation of this would be for every client to pre-download segment S(−1) of the ten (or some other number) most popular pieces of media object currently available. When the client requests one of these media objects, then the pre-downloaded segment S(−1) starts to play out while the segment S(0) is being downloaded, resulting in an apparent latency of zero.

Define rb(i,t) to be the aggregate rate at which a client downloads information about block i at time t, and define T(i) to be time that block i begins playing out, where again time is measured relative to the client, where time zero is when the client initiates the session and the download starts. Given a fixed maximum client download rate Rd, the goal of the MOD system is to achieve uninterrupted play out of the media object. This leads to the following three constraints:

1) For all i, $$\int_0^{T(i)} rb(i,t)\,dt \geq b(i) \qquad \text{(Equ. 3)}$$

2) For all t, $$rb(i,t) \leq rb(i) \qquad \text{(Equ. 4)}$$

3) For all i, t, $$\sum_{i=0}^{n-1} rb(i,t) \leq Rd \qquad \text{(Equ. 5)}$$

The constraint in (Equ. 3) is due to the fact that the client should have finished downloading block i by the time it needs to play it out, i.e., by the time blocks 0, . . . , i−1 have completed playing out.

Although the disclosure below can be described for general parameters, for clarity of explanation consider the special case where the media object has a play out rate Rp and the blocks are all the minimum size Bmin. Each block will have a play out time of Tf=Bmin/Rp seconds. Using this notation, T(i)=Ts+i·Tf. Define the startup latency number m to be the number of blocks that the client plays out in Ts seconds, i.e., m=Ts/Tf=Bmin·Ts/Rp. Note that m need not be an integer.

Figure 9:
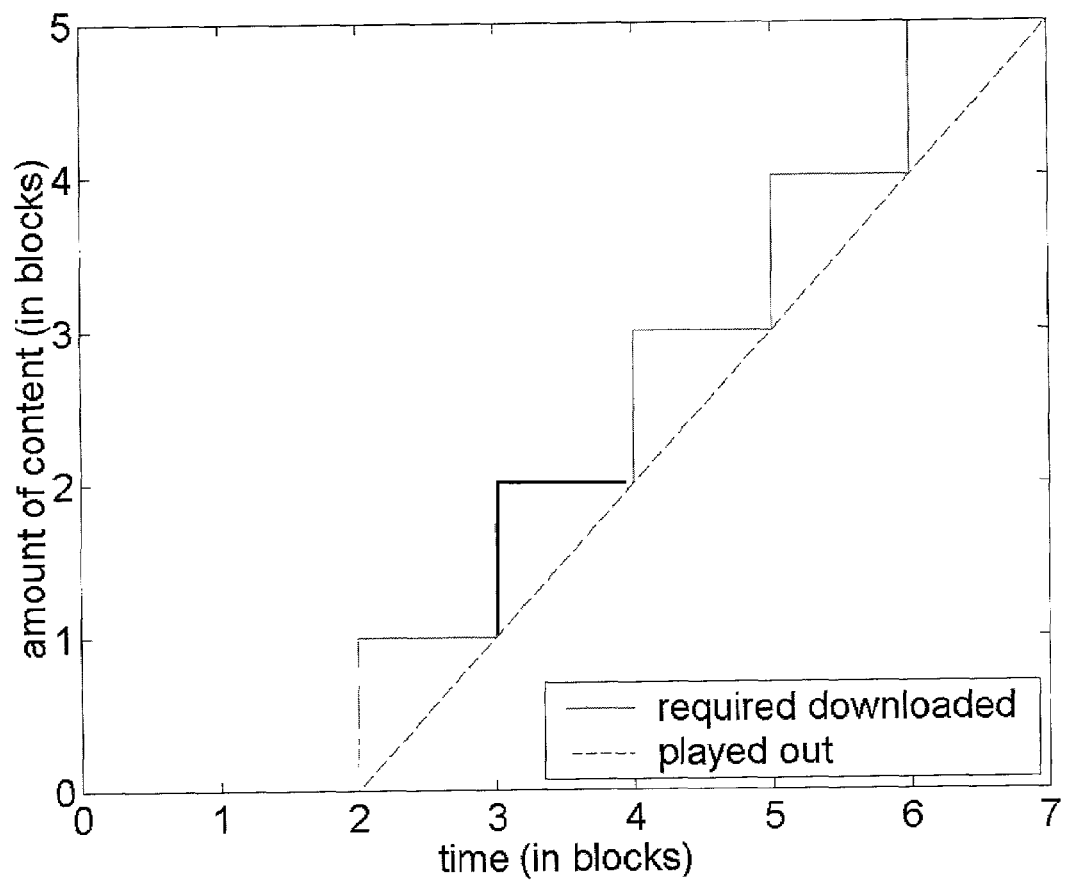
FIG. 9 is a plot of the amount of content that should be downloaded, and the amount of content that has played out, from the time the client request the content until it has completed playing out.

For example, consider a media object comprising five blocks of size Bmin, where the client starts to play out the content after a startup latency of m=2 blocks. FIG. 9 shows the amount of content that should be downloaded (solid line), and the amount of content that has played out (dashed line), from the time the client request the content until it has completed playing out. The stair-like graph showing the amount of content downloaded is due to the constraint in (Equ. 3) that a block should be downloaded completely before it can be played out. As the size of each block decreases, the height of the stairs decreases and the two curves approach one another.

In some embodiments, the play out rate is constant over time. In other embodiments, the play out rate may vary over time and Rp is the average play out rate for a block. If the play out rate varies substantially from block to block, then the scheduler may compensate by either varying the rate each block is served, and/or the size of each block, so that the block is downloaded in time to have uninterrupted play out at the client.

In one embodiment, the client accounts for variations in the play out rate by including an additional delay called a buffering latency, defined to be the time between when the latest segment has finished downloading and been reassembled and when the first block in the segment actually starts to play out. The buffering latency can be introduced at the client by increasing the initial startup latency. In this way, variations in the play out rate result in variations in the amount of buffering latency and do not affect the quality of the play out.

The constraint in (Equ. 4) exists because the client cannot download data for a block at a greater rate than what is being transmitted by the server for that block. The design of a scheduler where the client experiences loss is considered in more detail below.

Finally, the constraint in (Equ. 5) exists because the client can't download at a rate greater than the maximum allowed client download rate. Define the ratio of the maximum client download rate to the play out rate to be α=Rd/Rp. In order to achieve uninterrupted play out of the media object with a startup latency number m, comprising n blocks of size Bmin, each having a play out time of Tf, the following two inequalities should be satisfied.

$$\alpha \geq 1/m \qquad \text{(Equ. 6)}$$

$$\alpha \geq n/(n-1+m) \qquad \text{(Equ. 7)}$$

Note that (Equ. 6) and (Equ. 7) are a special case of (Equ. 3) and (Equ. 5), where all the blocks are chosen to be of size Bmin and there is no loss between the server and the client. The (Equ. 6) is the more stringent constraint when α≧1, and (Equ. 7) is the more stringent constraint when α<1.

The conditions in (Equ. 6) and (Equ. 7) come from the following considerations. The time it takes to play out i blocks of size Bmin plus the initial startup time is (i·Tf+Ts), or (i+m)·Tf seconds. During this time, the client downloads at most (i+m)·Tf·Rd Mbits of content. In order to have uninterrupted play out, when the client starts to play out block i, it should have already downloaded blocks 0 thru i, i.e., the first i+1 blocks, or (i+1)·Tf·Rp Mbits of content. Therefore, (i+m)·Tf·Rd≧(i+1)·Tf·Rp, for i=0, 1, . . . , n'−1. for uninterrupted play out at the client. Equivalently, α≧(i+1)/(i+m), for i=0, 1, . . . , n−1. If this is true for i=0 and i=n−1, then it is true for all i. Therefore, the two conditions in (Equ. 6) and (Equ. 7) should be satisfied for uninterrupted play out at the client.

For example, consider the play out of the media object comprising n=5 blocks shown in FIG. 9. For α≧1, (Equ. 6) applies, since the first block should be downloaded before play out can commence, and after that each block can be downloaded in time since the download rate is greater than the play out rate. Similarly, if α<1, then (Equ. 7) applies, since the last block should be downloaded in time to play it out. If the last block can be downloaded in time to play out, then all the other blocks should already have been downloaded and played out.

If the two necessary conditions are satisfied, then a straightforward scheduling method that satisfies the constraints in (Equ. 6) and (Equ. 7), is to have the server make each segment a single block and send out each segment on a single channel at a rate of Rd Mbps, which will allow a client to achieve the startup time Ts by consecutively downloading each segment in order at a rate Rd. For this straightforward scheduling method, the server should have a server bandwidth of Rs=n·Rd Mbps, so the server bandwidth grows linearly with the size of the media object. Alternative methods, described below, exhibit logarithmic growth in the server bandwidth requirement.

Figure 10:
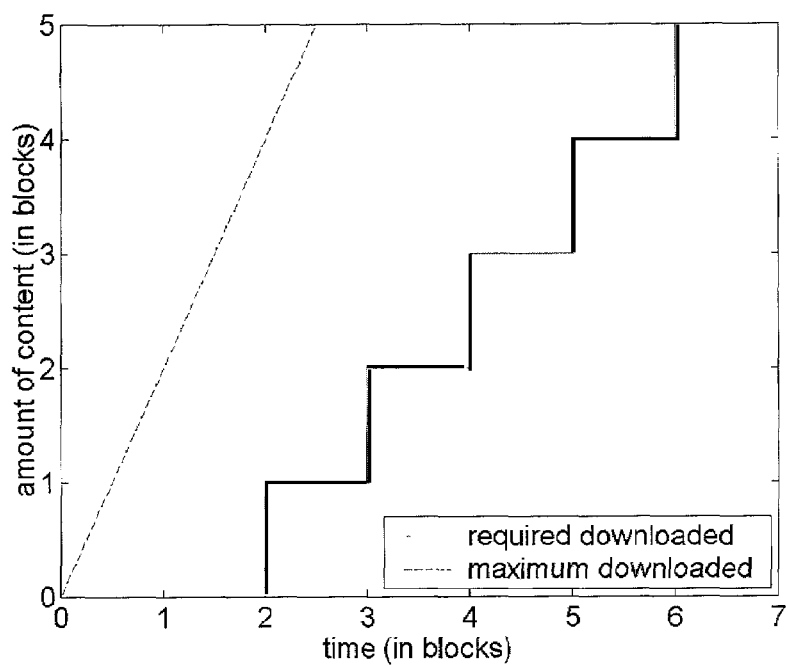
FIG. 10 and FIG. 11 show plots of the maximum amount of content that may be downloaded by the client for $\alpha=2$ and $\alpha=\frac{3}{4}$ respectively.
Figure 11:
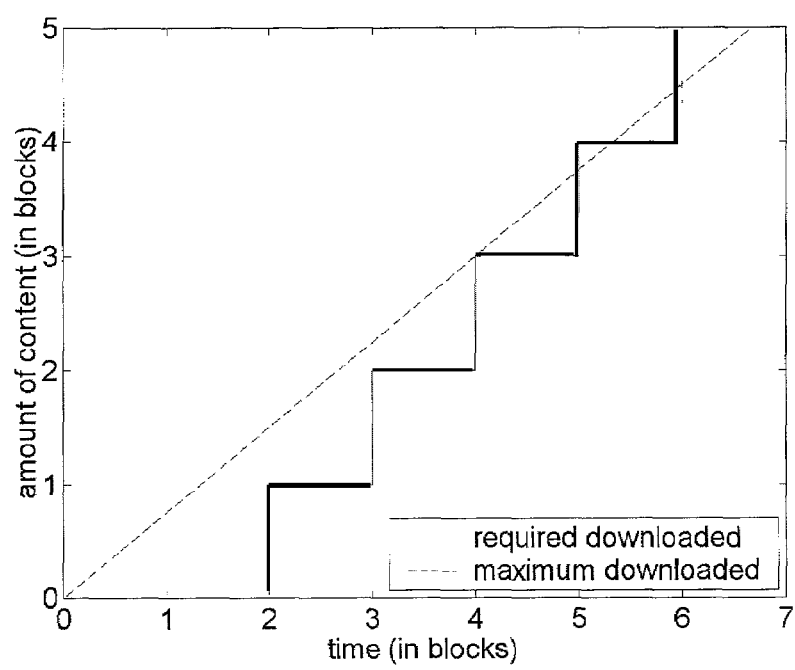

In FIG. 10 and FIG. 11, the dashed lines represent the maximum amount of content that can be downloaded by the client for $\alpha=2$ and $\alpha=\frac{3}{4}$ respectively. Using the same example as in FIG. 9, the amount of content that should be downloaded from the time the client requests the content until it has completed playing out is shown by the solid line in these figures. In FIG. 10, the dashed line is to the left of the solid line, so uninterrupted play out is possible. Decreasing the startup latency moves the curves closer together. In FIG. 11, the dashed line crosses the solid line, so uninterrupted play out is not possible. This agrees with (Equ. 7) which requires that $\alpha \geq \frac{5}{6}$ for uninterrupted play out. Increasing the startup latency number to $m=\frac{8}{3}$ makes uninterrupted play out achievable since now the two curves only intersect as the content completes downloading.

The scheduling methods described below all check if the system constraints satisfy (Equ. 6) and (Equ. 7) as a first step before trying to schedule the media object.

Adjusting the Schedule to Account for Channel Loss and Decoding Overhead

The media object schedule generator 214 uses an overhead function to adjust the rate and/or the time that each segment is scheduled to be downloaded by the client. Define the overhead function Eps(N(i)) to be a function of the size of segment S(i). The media object schedule generator 214 designs the schedule so that a client receiving the data on a channel for the schedule time, and with no loss, will receive N'(i)=(1+Eps(N(i)))·N(i) Mbits of data for segment S(i). The extra Eps(N(i))·N(i) Mbits of data is the overhead that the media object schedule generator 214 includes for segment S(i) in the designed schedule to allow for loss between the server and the client and/or any overhead required to reassemble the blocks in the segment. Eps(N(i)) is chosen so that each segment can be reassembled at the client with high probability.

In one embodiment of chain reaction codes, the number of extra symbols required at the decoder to reassemble a segment with high probability is proportional to the square root of the number of input symbols in that segment. The overhead function can therefore be chosen to be Eps(N(i))=$c/N(i)^{0.5}$, where c is a constant. The larger the value of c, the higher the probability that a chain reaction decoder collecting $N(i)+c \cdot N(i)^{0.5}$ Mbits of data, will be able to reassemble segment S(i). In one embodiment c is 13 or 14 depending on the value of N(i).

In another embodiment, consider a client that loses at most a fraction p of the data it is meant to receive. For example, a client may adjust its reception rate in response to congestion by joining and leaving channels. A client experiencing up to certain levels of congestion may be expected to be joined to a particular channel at least 1−p of the schedule time for that channel. If the overhead function is chosen to be Eps(N(i))=p/(1−p), then a client with no loss will receive 1/(1−p) times the data of a client that loses a fraction p. Any client that loses up to a fraction p of the data it is meant to receive for segment S(i) will receive at least N(i) Mbits of information about S(i) and be able to reassemble segment S(i) completely assuming a perfect erasure code is used. In this case Eps(N(i)) is independent of N(i).

In another embodiment, consider a scheme where a client that has no loss would receive d' packets on channel C for segment S(i), and consider a client that loses each packet independently with probability p. The probability that the client with loss receives d or more packets is equal to $$\sum_{i=0}^{d'-d} \binom{d'}{i} p^i (1-p)^{d'-i}, \qquad \text{(Equ. 8)}$$

i.e., the probability that d'−d or less packets are lost. For example, if N(i) Mbits is equivalent to 100 packets and perfect erasure codes are used for the channel, and each packet is lost with probability 0.1, i.e., an expected 10% packet loss rate, then in order for the client to receive at least d=100 packets for segment S(i) with 99.99% probability, d'=126 packets. In general, Eps(N(i)) can be chosen according to the loss rate and number of packets in segment S(i), so that at least N(i) Mbits is received with some probability.

In another embodiment, the overhead function Eps(N(i))=0, when no loss is allowed for at the client and the original data is transmitted across the channels.

In addition, the overhead function could be chosen to account for both a packet loss fraction p, as well as the decoder overhead required for chain reaction codes or other codes. The overhead function could also be dependent on the schedule pair, or the number of blocks in the segment. For example, for a client that experiences loss in bursts, the schedule time for each segment affects the variance of the loss rate seen by the client for that segment.

Another consideration in choosing the overhead function is whether the client is concerned only about the quantity of data it receives, or which particular data it receives. If the particular data received by the client is important, then the overhead function Eps(N(i)) may have to account for duplicate packets received at the client. For instance, if the original data is transmitted, or if a fixed rate FEC code is used, then it is important to organize the data so that a client will receive all the data it requires to reassemble the block, with as little duplication as possible. In this case, choosing the overhead function becomes much more difficult. When chain reaction codes are used, the client only cares about the quantity of reception for each block. The particular data that is received is generally not an issue if the data for each block on the channel is transmitted according to the methods described in Luby I, Luby II, and the Scheduling Multiple Files Application unless the number of blocks in a segment is large.

It is to be understood that the above overhead functions are merely for illustrative purposes and are not intended to limit the scope of the claims herein. One skilled in the art would recognize many variations, modifications, and alternatives.

When Eps(N(i)) is not zero, (Equ. 6) and (Equ. 7) are still necessary but may no longer be sufficient conditions for uninterrupted play out to be possible at the client. For example, if the client loses up to a fraction p of the data it is mean to receive for each segment, then it's actual reception rate may be as small as Rd·(1−p). In this instance, (Equ.

6) and (Equ. 7) can be made necessary and sufficient conditions by substituting $\alpha \cdot (1-p)$ for $\alpha$.

Optimal Server Bandwidth Scheduling (OSB)

Optimal server bandwidth scheduling (OSB) is one scheduling method that can be used by the media object schedule generator 214, when there is no restriction on the client download bandwidth Rd. The media object schedule generator 214 first partitions the media object into n blocks. Each segment comprises a single block, i.e., n'=n and N(i)=b(i), for i=0, . . . , n−1, and each segment is served on one channel, so there is a schedule pair (I(i),E(i)) associated with each segment. Segment S(i) is served at a rate of N(i)·(1+Eps(N(i)))/T(i) Mbps, where T(i) is the time that block i begins playing out. If the play out rate is Rp Mbps, then $$T(i) = Ts + \sum_{j=0}^{i-1} \frac{N(j)}{Rp} \quad \text{(Equ. 9)}$$

The schedule pairs are I(i)=0 and E(i)=T(i), for i=0, . . . , n−1. The client initially joins all n channels and receives data from each channel concurrently, i.e., g=r=n. After a segment has been received completely, the client drops the channel associated with that segment.

For example, the media object schedule generator 214 can choose to partition the media object into blocks that are the minimum possible size, i.e., N(i)=b(i)=Bmin, for i=0, . . . , n−1. Each segment will have a play out time of Tf=Bmin/Rp seconds, so the startup latency number m=Ts/Tf. If Eps(N(i))=0, then segment S(i) is served at a rate of N(i)/T(i)=Bmin/(Ts+i·Bmin/Rp)=Rp/(i+m) Mbps, for i=0,1, . . . , n−1. The required server bandwidth is therefore $$Rs = Rp \sum_{i=0}^{n-1} \frac{1}{(i+m)} \quad \text{(Equ. 10)}$$

The harmonic sum $$H(n) = \sum_{i=1}^{n} 1/i$$

can be approximated as ln(n), so for large m, Rs≈Rp·ln((n+m−1)/(m−1)) Mbps, i.e., the server bandwidth requirement grows logarithmically in n.

Figure 12:
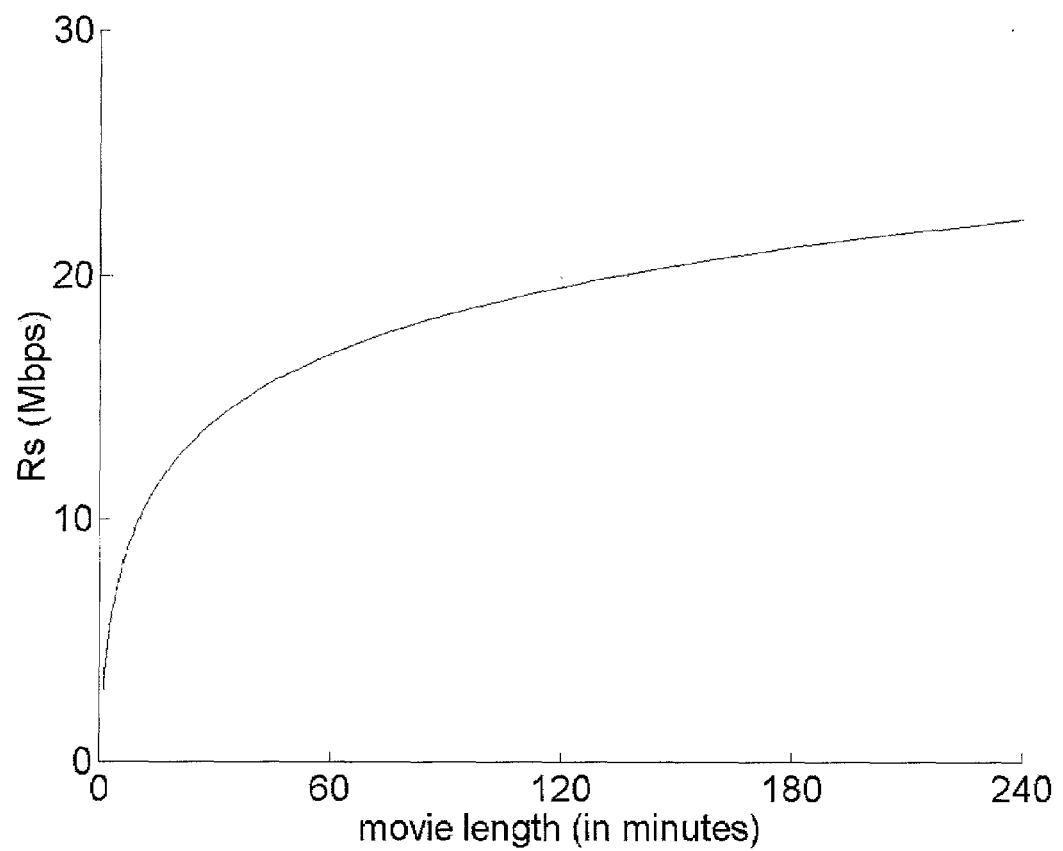
FIG. 12 shows a plot of the amount of required server bandwidth as the length of the movie varies from 1 minute to 4 hours for optimal server bandwidth scheduling.

For example, consider a two hour movie with a play out rate Rp=4 Mbps and a startup latency of 1 minute. If the minimum block size Bmin=40 Mbits, then Tf=Bmin/Rp=10, n=720 and m=6. The required server bandwidth is 19.52 Mbps. FIG. 12 shows the amount of required server bandwidth as the length of the movie varies from 1 minute to 4 hours.

In another embodiment, the media object schedule generator 214 groups all the blocks in the media object into a single segment and transmits the media object on a single channel, i.e., g=r=1. In this embodiment, each block in the segment is served at a different rate on the channel, where block i is served at a rate of rb(i)=N(i)·(1+Eps(N(i)))/T(i) Mbps. The schedule pair for the single channel is I=0 and E=T(n−1). The client may filter out any output symbols from a block that has completed downloading. Once the first block has been received completely, the client starts to play out the media object. Thus, the startup latency is equal to the time it takes to download the first block.

In another embodiment, for instance when the number of channels concurrently available to the client of the server is restricted, the n blocks of the media object may be grouped into n'=min{r, g} segments, where each segment is transmitted on a single channel. In this embodiment, each block in the segment is served at a different rate on the channel, where block i is served at a rate of rb(i)=N(i)·(1+Eps(N(i)))/T(i) Mbps. The schedule pairs for segment S(i) are I(i)=0 and E(i)=T(j), where j is the highest block index in segment S(i), for i=0, . . . , n'−1, i.e., the index of the last block to start playing out in segment S(i). Alternatively, each block in segment S(i) may be served at the same rate of max {rb(j)=N(j)·(1+Eps(j)))/T(j)|S(i) contains block j}. Here, the schedule pairs for segment S(i) are I(i)=0 and E(i)=T(j), where j is the smallest block index in segment S(i), for i= 0, . . . , n'−1, i.e., the index of the first block to start playing out in segment S(i). The number of blocks in each segment may be chosen so that each segment is transmitted at approximately the same rate. Alternatively, the number of blocks in each segment may be chosen so that each segment contains approximately the same number of blocks, or is approximately the same size.

Restricted Client Download Bandwidth Scheduling Schemes

The schemes that are described below are different scheduling methods that can be used by the media object schedule generator 214 when there is a restriction on the maximum client download rate Rd. A maximum client download rate is a realistic concern for most MOD systems since the client's maximum download rate depends on the type of connection it has to the network. For example, the MOD system may want to serve a media object with a 300 Kbps play out rate to clients connected over DSL with a maximum Rd=400 Kbps, so Rd=4Rp/3. As another example, the MOD system may want to serve an MPEG-1 media stream with a play out rate of 1.4 Mbps to clients connected over a T1 line with a maximum download rate of 1.5 Mbps.

Variable Rate Fixed Segment Size Scheduling (VRFS)

Variable rate fixed segment size (VRFS) scheduling is a scheduling method that can be used by the media object schedule generator 214 when there is a restriction on the maximum client download rate Rd. In one embodiment, the VRFS scheduler partitions the media object into blocks and segments in a pre-processing step. In another embodiment, the VRFS scheduler determines the next segment size and blocks in the segment for the media object when the VRFS scheduler is ready to schedule the next segment, or when enough data for a new segment becomes available.

In one embodiment, the VRFS scheduler first partitions the media object into blocks. For example, each block could be chosen to be the minimum block size Bmin, or the blocks could be chosen according to specific breaks in the play out. One or more blocks are grouped together to form each segment. In another embodiment, the VRFS scheduler first partitions the media object into segments. Each segment is then partitioned into one or more blocks. In a preferred embodiment, the blocks within each segment are all chosen to be the same size. For VRFS scheduling, each segment is served on one channel, so there is a schedule pair (I(i),E(i)) associated with each segment.

The VRFS scheduler uses a greedy algorithm to determine when to schedule a segment to be downloaded, where the segments are scheduled to be downloaded in order When a segment S(i) completes downloading at time E(i), the bandwidth used to download segment S(i) is made available and the VRFS scheduler schedules as many new segments to be downloaded as possible up to the maximum client download bandwidth. Each segment is scheduled to start downloading at the client as early as possible.

Figure 13:
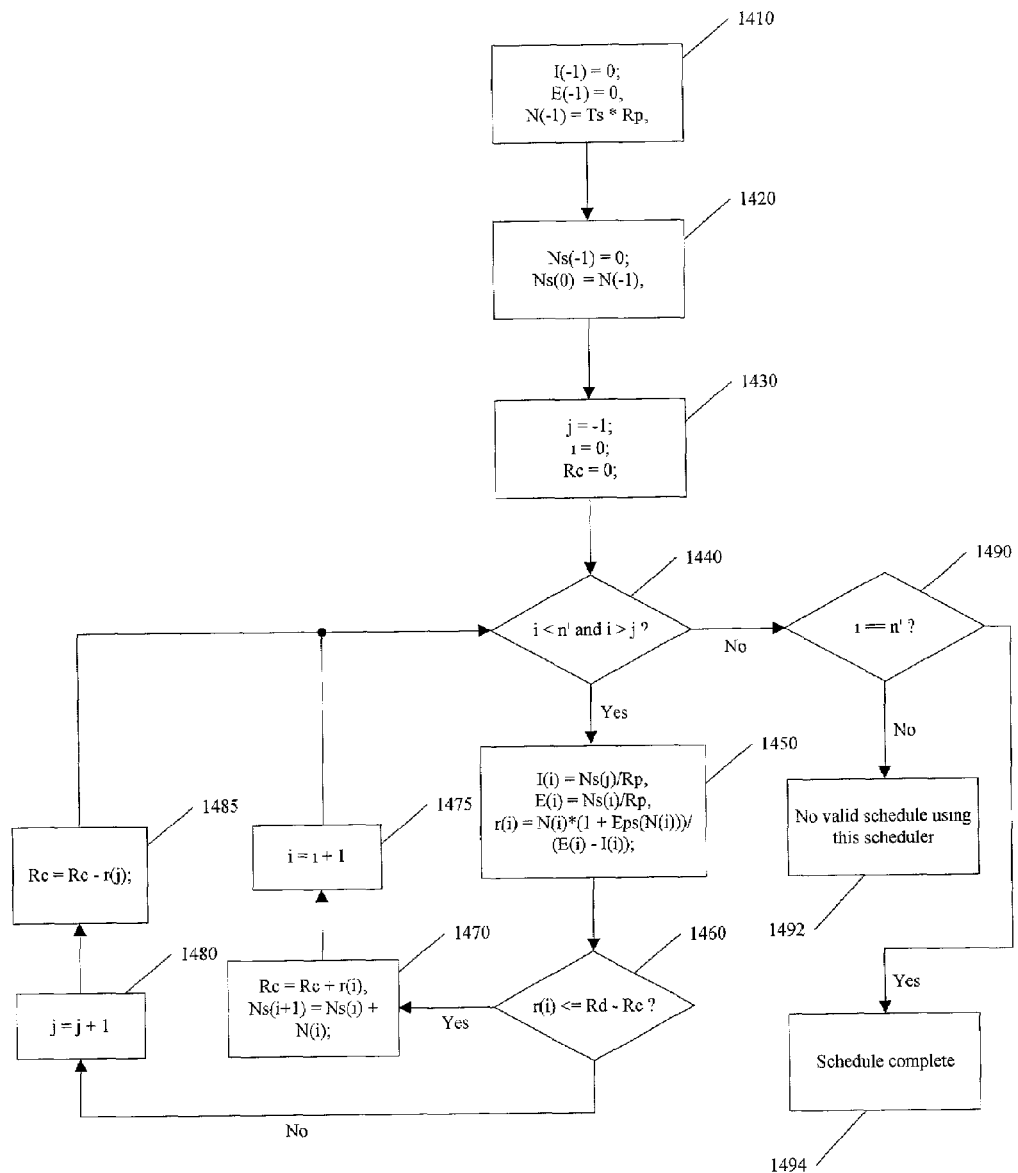
FIG. 13 is a simplified flow diagram of a process that may be used by the media object schedule generator shown in FIG. 2, to determine how to schedule a media object using a variable rate fixed segment size scheduler.

FIG. 13 is a simplified flow diagram of a method, according to an embodiment of the invention, that may be implemented by a media object schedule generator 214, using a VRFS scheduler, to determine the rate and schedule pair for each segment in a media object, so that the client can download the media object and play it out uninterrupted. This diagram is merely for illustrative purposes and is not intended to limit the scope of the claims herein. First, in a step 1410, the schedule pair (I(−1), E(−1)) for the pseudo-segment S(−1) is initialized to zero since the client does not download this segment. The pseudo-segment S(−1) plays out for Ts seconds so N(−1)=Ts·Rp Mbits. Next in a step 1420 Ns(−1) and Ns(0) are initialized to 0 and N(−1) respectively. In general, $$Ns(i) = \sum_{j=-1}^{i-1} N(i) \text{ Mbits,}$$

i.e., Ns(i) is the aggregate size of the segments S(−1) to S(i−1). In another embodiment, Ns(i) can be precalculated, for i=−1,0,1, . . . , n−1, if the size of all the segments is known beforehand. If the play out rate is Rp Mbps, then segment S(i) begins playing out Ns(i)/Rp seconds after the client requests the content.

In step 1430, j, i and Rc are all initialized, where j represent the segment S(j) in the schedule that is currently playing out, i represents the next segment S(i) to be scheduled to be downloaded while segment S(j) is playing out, and Rc represents the download bandwidth scheduled for use at the client when segment S(j) is playing out. At this point, no segment has been scheduled for downloading, so i=0, and Rc=0. Initially, the pseudo-segment S(−1) is playing out so j=−1.

In step 1440, the VRFS scheduler checks if there are any more segments to be scheduled for downloading, i.e., if i<n, and if the next segment to be scheduled to be downloaded is less than the segment that is currently playing out, i.e., if i>j. In step 1450, the VRFS scheduler attempts to schedule the next segment S(i) to be downloaded. The segment S(i) is designed to start downloading when segment S(j) starts playing out and complete downloading when segment S(i) is due to start playing out, i.e., I(i)=Ns(j)/Rp and E(i)=Ns(i)/Rp. The serving rate r(i) for segment S(i) is chosen so that N'(i) Mbits of data can be downloaded by the client in the schedule time of E(i)−I(i) seconds.

Next in step 1460, the VRFS scheduler checks whether the current available bandwidth at the client when segment S(j) is playing out, which is Rd−Rc Mbps, is large enough to start downloading segment S(i) at rate r(i). If r(i)≦Rd−Rc, then the segment S(i) can be downloaded when segment S(j) is playing out. In steps 1470 and 1475, Rc is updated to include the bandwidth required to download segment S(i), Ns(i+1) is calculated, and the scheduler increments i by 1, so the next segment can be scheduled for downloading. If r(i)>Rd−Rc, then in steps 1480 and 1485, the scheduler increments j by 1 to indicate that segment S(i) can not be scheduled to be downloaded until at least the next segment completes downloading and starts playing out. The bandwidth r(j) that becomes available when segment S(j) completes downloading is also subtracted from Rc, and the VRFS scheduler tries to reschedule segment S(i) if i>j in steps 1440 and 1450.

In step 1490, the VRFS scheduler checks if all the segments have been scheduled for downloading. If yes, then the VRFS scheduler completes successfully in step 1494. If the VRFS scheduler reaches a state where the next segment to be downloaded is supposed to be the segment that is currently being played out, i.e., i=j, then in step 1492, the scheduler declares that there is no valid schedule using this scheduler.

Figure 14:
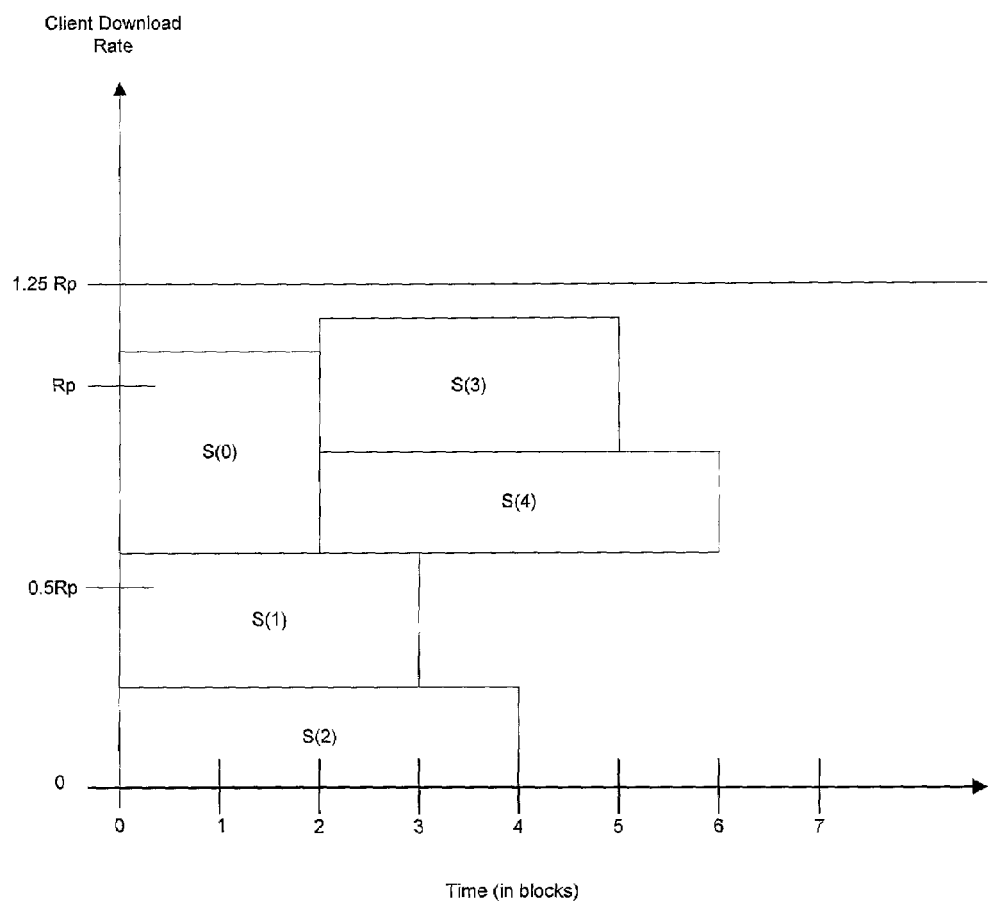
FIG. 14 is an illustration of how a variable rate fixed segment size scheduler may schedule the first five segments in a media object.

For example, the media object schedule generator 214 can choose to partition the media object into blocks that are the minimum possible size, i.e., b(i)=Bmin, for i=0, . . . , n−1. Each segment is one block and has a play out time of Tf=Bmin/Rp seconds, so the startup latency number m=Ts/Tf. FIG. 14 shows how the VRFS schedules the first 5 segments of content when Rd=1.25 Rp, m=2 and Eps(N(i))=0. The x-axis shows time in units of blocks and the y-axis shows the bandwidth in units of the play out bandwidth. The height of each segment is equal to the rate that the segment is downloaded by the client. The VRFS scheduler initially schedules the first three segments at rates Rp/2 Mbps, Rp/3 Mbps and Rp/4 Mbps respectively. At this point, the client is downloading at an aggregate rate of 1.08Rp Mbps. Segment S(3) requires 0.2Rp Mbps to download so there is not enough bandwidth available to start downloading segment S(3). When segment S(0) completes downloading, the VRFS scheduler can schedule the client to start downloading segment S(3) and segment S(4) at rates Rp/3 Mbps and Rp/4 Mbps respectively. The VRFS scheduler first drops the bandwidth associated with segment S(0), so the aggregate download rate when segment S(0) is playing out is 1.17Rp Mbps. The process continues until all the segments have been scheduled to be downloaded.

As another example, consider again the two hour movie with a play out rate Rp=4 Mbps, a startup latency of 1 minute, and a segment size Bmin=40 Mbits, for all the segments. If Rd=2Rp and Eps(N(i))=0, then the VRFS scheduler schedules the first 35 segments to start downloading before block 0 starts to play out. The play out begins when segment S(0) completes downloading. At this point, the VRFS scheduler drops the bandwidth associated with segment S(0), since it has completed downloading, and schedules segments S(35) through S(40) for downloading. The last segment S(719) is only scheduled to start downloading once segment S(137) starts playing out. The required server bandwidth is Rs=21.95 Mbps, which is about 2.43 Mbps greater than that required by OSB.

For the first 137 blocks played out, i.e., until the client starts downloading the last segment in the content, the VRFS scheduler uses about 99.9% of the available download bandwidth, which is very efficient. When Rd is reduced to 1.5 Rp in the above example, then the client downloads at about 99.8% of the maximum download rate until the last segment has started downloading. The required server bandwidth is 27.04 Mbps. In these examples, the VRFS scheduler makes very efficient use of the available client download bandwidth.

As the startup latency and/or the maximum client download bandwidth are reduced, the VRFS scheduler may become less efficient. In fact, since the VRFS scheduler is not guaranteed to download at the maximum download rate Rd, it is possible to satisfy the conditions in (Equ. 6) and (Equ. 7), and not actually be able to achieve uninterrupted play out. For example, for equal sized segments Bmin, m=2, n=5 and Rd=5Rp/6, (Equ. 6) and (Equ. 7) are satisfied, but the VRFS scheduler cannot schedule the five segments to be downloaded to achieve uninterrupted play out at the client.

In another embodiment, the VRFS scheduler can schedule the segments to be downloaded in an arbitrary order, as long as each segment completes downloading before it is scheduled to play out. When a segment completes downloading, as many new segments as possible are scheduled to start downloading at the client, until all the segments have been scheduled to be downloaded.

In another embodiment, the segments can be served on more than one channel. As before, once each segment completes downloading, the VRFS scheduler tries to schedule as many segments as possible for the client to download up to the maximum client download bandwidth. If there is not enough bandwidth available to completely download segment S(i) when segment S(j) is playing out, then segment S(i) may be downloaded on more than one channel. Alternatively, the server can avoid serving segment S(i) on multiple channels and instead increase the size of segment S(i-1) so that segment S(i-1) requires all the remaining download bandwidth at the client when segment S(j) is playing out.

Fixed Rate Variable Segment Size Scheduling (FRVS)

Fixed Rate Variable Segment Size (FRVS) scheduling is a scheduling method that can be used by the media object schedule generator 214 when there is a restriction on the maximum number of concurrent channels at the client r, and when there is a restriction on the maximum client download rate Rd.

In one embodiment, the FRVS scheduler first partitions the media object into n' segments, where each segment is further partitioned into one or more blocks. In a preferred embodiment, the blocks within each segment are all chosen to be the same size. Each segment is served on one channel, so there is a schedule pair (I(i),E(i)) associated with each segment. Each segment is served at the same rate of b Mbps. If the maximum client download bandwidth is Rd Mbps, then since r segments are downloaded concurrently, b=Rd/r Mbps and the required server bandwidth is Rs=(n'·Rd)/r Mbps.

The FRVS scheduler schedules the segments to be downloaded in order where the client is downloading from at most r channels at a time. The client starts to play out the media object once the segment S(0) has been received completely. Once segment S(i) completes downloading, the client starts downloading segment S(i+r), while i<n'-r. As each of the last r segments complete downloading, there are no more segments to be downloaded so the client's reception rate decreases. The FRVS scheduler chooses the size of segment S(i) based on the constraint that segment S(i) should finish downloading and be reassembled before segment S(i-1) finishes playing out.

Figure 15:
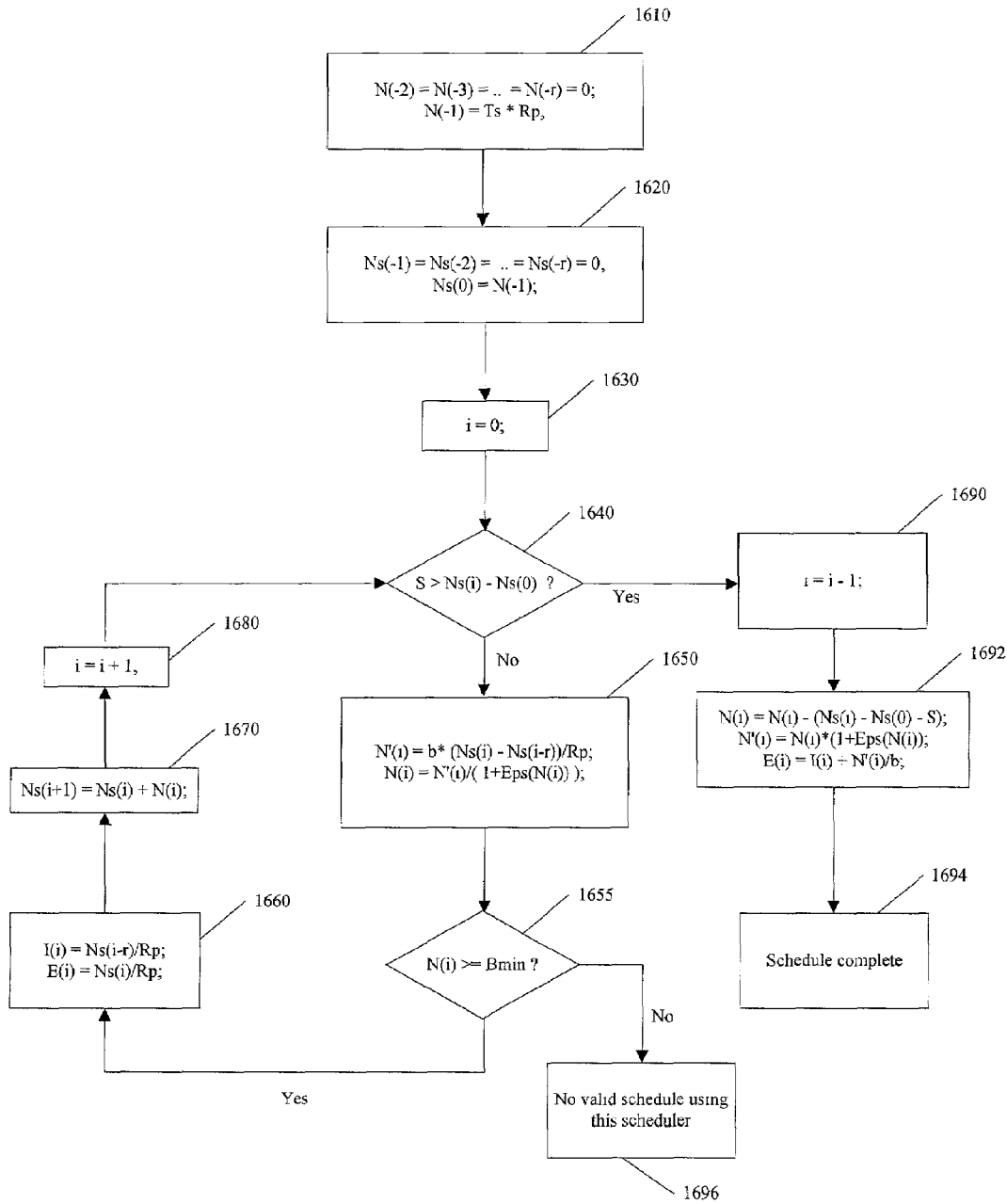
FIG. 15 is a simplified flow diagram of a process that may be used by the media object schedule generator shown in FIG. 2, to determine how to schedule a media object using a fixed rate variable segment size scheduler.

FIG. 15 is a simplified flow diagram of a method, according to an embodiment of the invention, that may be implemented by a media object schedule generator 214, using a FRVS scheduler, to determine the size of each segment in a media object, so that the client can download the media object and play it out uninterrupted. This diagram is merely for illustrative purposes and is not intended to limit the scope of the claims herein. First, in a step 1610, the N(-2), N(-3), ..., N(-r) are initialized to zero. These are the sizes of the r-1 of the r pseudo-segments pre-pended by the FRVS scheduler to the sequence of segments. The other segment is pseudo-segment S(-1) and plays out for Ts seconds so N(-1)=Ts·Rp Mbits. Segments S(-1), S(-2), ..., S(-r) do not appear in the schedule produced by the media object schedule generator 214.

Next in step 1620, Ns(-1), Ns(-2), ..., Ns(-r) are initialized to zero and Ns(0) is initialized to N(-1). In general, $$Ns(i) = \sum_{j=-r}^{i-1} N(i) \text{ Mbits},$$

i.e., Ns(i) is the size of the first i segments plus the size of the pseudo-segment S(-1) and the pre-pended pseudo-segments of size 0. If the play out rate is Rp Mbps, then segment S(i) begins playing out Ns(i)/Rp seconds after the client requests the content. In step 1630, i is initialized, where i represents the next segment to be scheduled to be downloaded. At this point, no segment has been scheduled for downloading, so i=0.

In step 1640, the FRVS scheduler checks if the size of the media object S is greater than the cumulative size of all the segments that have been scheduled so far excluding the r pre-pended segments, i.e., S>Ns(i)-Ns(0). If no, then in step 1650, the FRVS scheduler determines the size of the next segment S(i) to be downloaded. First, the FRVS scheduler calculates the amount of data N'(i) that a client with no loss would receive if it downloads segment S(i) at rate b=Rd/r during the play out time of the previous r segments. Then, the size of segment N(i) is chosen by solving the equation N'(i)=N(i)·(1+Eps(N(i))) for N(i). In step 1655, the FRVS checks if the segment N(i) is at least as large as the minimum segment size. If it is not, then in step 1696, the scheduler declares that there is no valid schedule using this scheduler. If it is, then in step 1660, the schedule pair (I(i), E(i)) is chosen. The segment S(i) is designed to start downloading when segment S(i-r) starts playing out and complete downloading when segment S(i) is due to start playing out, i.e., I(i)=Ns(i-r)/Rp and E(i)=Ns(i)/Rp. In steps 1670 and 1680, Ns(i+1) is calculated, and the scheduler increments i by 1, so the next segment can be scheduled for downloading.

When the cumulative size of the segments scheduled is greater than or equal to the file size, the FRVS scheduler goes to step 1690. In step 1690, i is decremented by 1 and in step 1692, the FRVS scheduler adjusts the size of segment S(i) so that the sum of the segments sizes N(0)+N(1)+N(2)+ . . . +N(n'-1)=S Mbits and adjusts E(i) so that a client with no loss would download N'(i) Mbits in time E(i)-I(i). Finally, in step 1694 the scheduler completes.

If the last segment is smaller than the minimum block size, then there are a number of ways for the FRVS scheduler to increase the size. In one embodiment, the size of the last segment can be increased by decreasing the download rate of the second last segment to decrease it in size, and therefore increase the size of the last segment by the same amount. In another embodiment, if the last segment is small enough, the download rate of the second last segment can be increased so that there is no need for another segment.

For example, consider a 2 hour movie with a play out rate Rp=4 Mbps, a startup latency of 1 minute, and a minimum block size of 40 Mbits. If Rd=2Rp, Eps(N(i))=0, and r=5, then n'=17 and the segment sizes in Mbits are

| | | |
|---|---|---|
| N(0) = 96 | N(1) = 134.4 | N(2) = 188.2 |
| N(3) = 263.4 | N(4) = 368.8 | N(5) = 420.3 |
| N(6) = 550.0 | N(7) = 716.3 | N(8) = 927.5 |
| N(9) = 1193.2 | N(10) = 1522.9 | N(11) = 1964.0 |
| N(12) = 2529.6 | N(13) = 3254.9 | N(14) = 4184.9 |
| N(15) = 5382.9 | N(16) = 5101.6 | |

The required server bandwidth is Rs=27.2 Mbps, which is 7.68 Mbps greater than OSB. When r is set to 12, there are 36 segments and the server bandwidth is Rs=24 Mbps. The server bandwidth can be further reduced by serving the last segment S(n'−1) at a lower rate. For instance, for the above example where r=5, if the rate of the last segment is reduced so that the last segment only completes downloading when it is due to be played out, then the server bandwidth is reduced by almost 1 Mbps. In another embodiment, the rate b Mbps that each segment is served or the startup latency can be reduced so that when the loop exits in step 1660, Ns(i)−Ns(0)=S.

Figure 16:
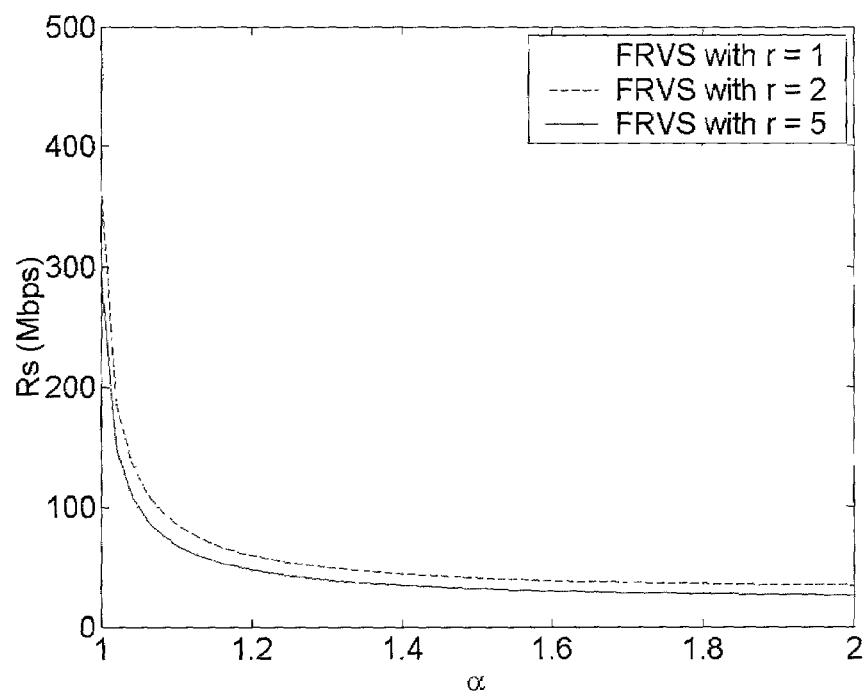
FIG. 16 shows a plot of the amount of required server bandwidth versus a for various numbers of concurrent channels at the client for a fixed rate variable segment size scheduler.
Figure 17:
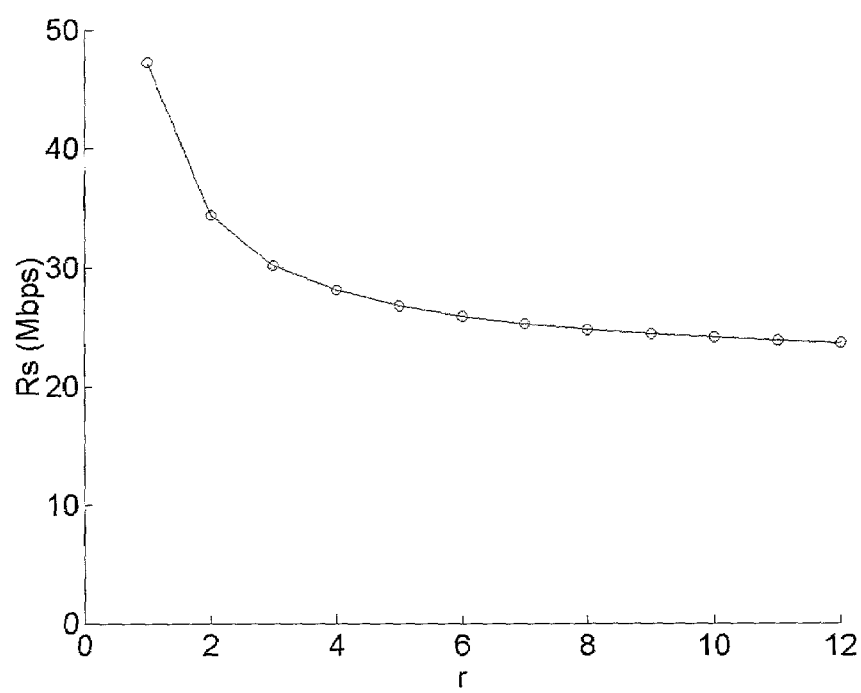
FIG. 17 shows a plot of the amount of required server bandwidth versus the number of concurrent channels at the client for a fixed rate variable segment size scheduler.

FIG. 16 shows the server bandwidth requirement for FRVS with r=1, 2 and 5, in the above example when α is varied from 1 to 2. FIG. 17 shows the server bandwidth requirement for FRVS for the above example when r varies from 1 to 12. If there is an additional system constraint of a minimum block size of Bmin=40 Mbits, then for the above example r should be less than or equal to 12, in order to ensure that the first segment is at least as large as the minimum block size. The server bandwidth generally decreases as r increases although the additional server bandwidth savings also decreases as r decreases.

If there is a restriction on the minimum segment size, then it is still possible to design an FRVS scheme such that the client can download up to r channels simultaneously as follows. Divide the available bandwidth into r channels where each channel is assigned an equal share of the client download bandwidth. As before, the segment sizes that are already chosen determine the size of the next segment. Each new segment is scheduled to be downloaded at an aggregate rate of c·Rd/r, where c is an integer between 1 and r. Generally, c should be chosen to be as small as possible but large enough to ensure that the segment is at least as large as the minimum segment size.

Figure 18:
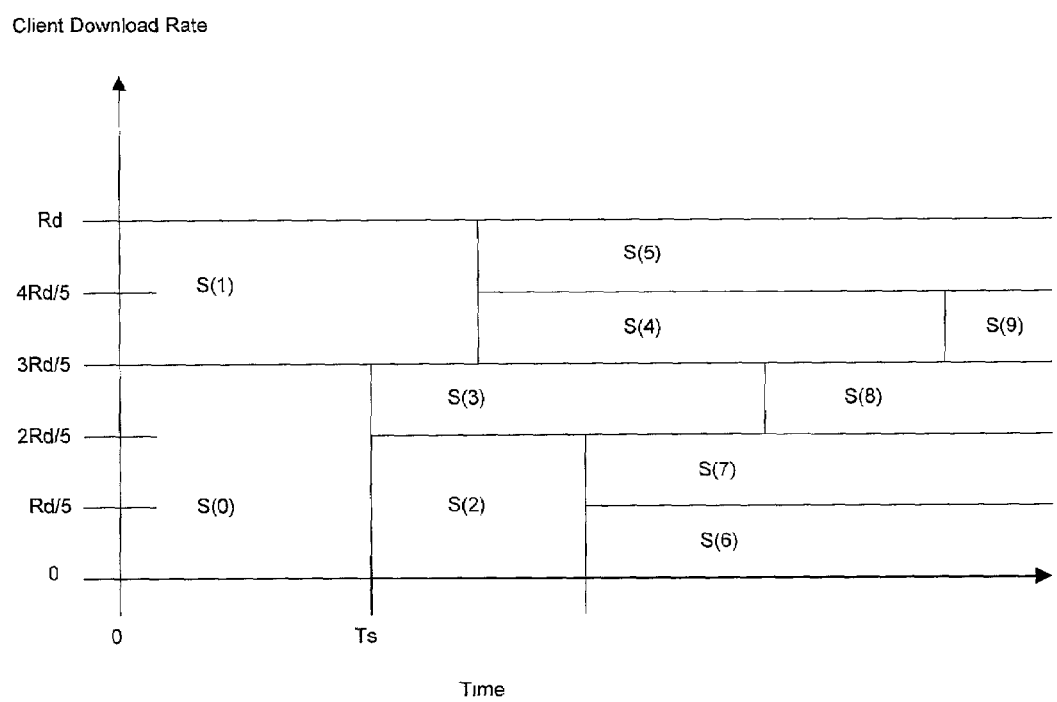
FIG. 18 is an illustration of how a fixed rate variable segment size scheduler may schedule the first ten segments in a media object when the download bandwidth for a single segment is split among later segments.

FIG. 18 shows an example of how the scheduler allocates the available bandwidth to each segment when r=5, for the first 10 segments of the media object. In this example, the segments increase in size, so the time to download future segments is greater than for previous segments (since the segments also take longer to play out). Therefore, future segments will require less bandwidth to achieve the minimum segment size. The y-axis represents the client download bandwidth and the x-axis represents time. The length of each segment represents how long it is designed to be downloaded by the client and the height represents the bandwidth at which the client downloads the segment. For instance, segment S(0) is downloaded from time 0 to Ts using 3Rd/5 Mbps of the bandwidth.

In this example, the scheduler will initially try to make the segment S(0) to be N'(0)=Rd·Ts/r Mbits in size. However, when the FRVS solves N(0)=N'(0)/(1+Eps(N(0))), N(0) is less than the minimum required block size. So, the scheduler tries to download the first segment at rate c·Rd/r Mbps, incrementing c by 1 until N'(0)=c·Rd·Ts/r Mbits allows N(0) to be greater than the minimum segment size. In the figure, c=3. Similarly for segment S(1), c=2. When segment S(0) completes downloading, there is enough time to download segment S(2) at only 2Rd/r Mbps and segment S(3) at Rd/r Mbps. If segment S(3) is too small if downloaded at Rd/r Mbps, then the FRVS scheduler could either make segment S(2) larger by downloading it at 3Rd/r Mbps, or assign S(3) a second channel when S(1) completes downloading.

Figure 19:
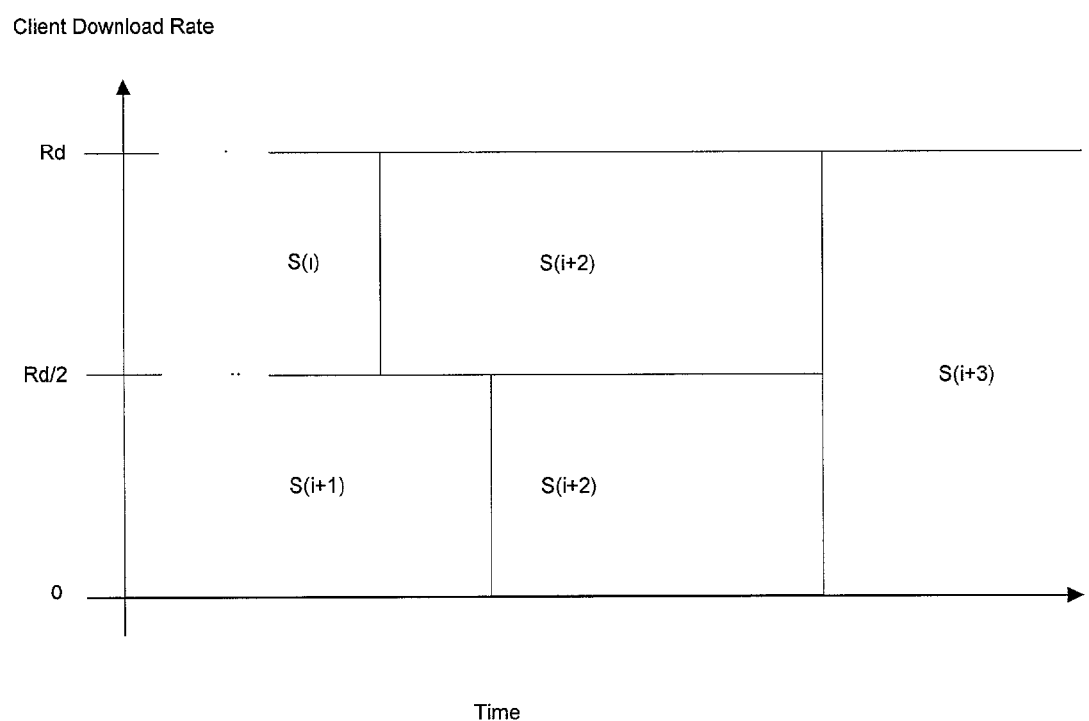
FIG. 19 is an illustration of how a fixed rate variable segment size scheduler may schedule five segments in a media object when the download bandwidth for two segments is combined for use in later segments.

FIG. 19 shows an example of how the scheduler allocates the available bandwidth to each segment for r=2. In this example, the segments decrease in size, so the time to download future segments is less than that for previous segments. Therefore, future segments will require more bandwidth to achieve the minimum block size. In FIG. 19, segment S(i+2) would not be large enough if it is only downloaded at a rate of Rd/2 Mbps. The bandwidth available after segment S(i+1) completes downloading is therefore also assigned to segment S(i+2) so that S(i+2) achieves the minimum segment size. Segments S(i+3) is downloaded at Rd Mbps.

In one embodiment, a segment that is served at a rate of c·Rd/r Mbps is served on a single channel. In another embodiment, a segment that is served at a rate of c·Rd/r Mbps is served on c channels where each channel is served at a rate of Rd/r Mbps.

Since each segment should be downloaded completely before it can be played out, the maximum storage requirement at the client is lower bounded by the size of the largest segment. Thus, when the client storage requirement is limited, it may be preferable to increase the server bandwidth and the total number of segments in the media object, and place an upper limit on the segment size. The server bandwidth can be further divided so that a segment finishes downloading as late as possible before it is scheduled to play out.

In one embodiment, if the media object is first partitioned into blocks where the block sizes are fixed, then the segment sizes can be adjusted so that a segment contains an integer number of blocks by decreasing or increasing the segment size. This can be done by changing the rate that each segment is served. The size and rate of segments scheduled later in the play out may be adjusted accordingly.

Restricted Server Channel Scheduling (RSC)

Restricted server channel scheduling (RSC) is a scheduling method that can be used by the media object schedule generator 214 when there is a restriction on the maximum number of concurrent channels at the server g, the maximum client download rate Rd, and the maximum number of concurrent channels at the client r. The RSC scheduler partitions the media object into at most g segments, where each segment is served on one or more channels such that the maximum number of channels is g.

Figure 20:
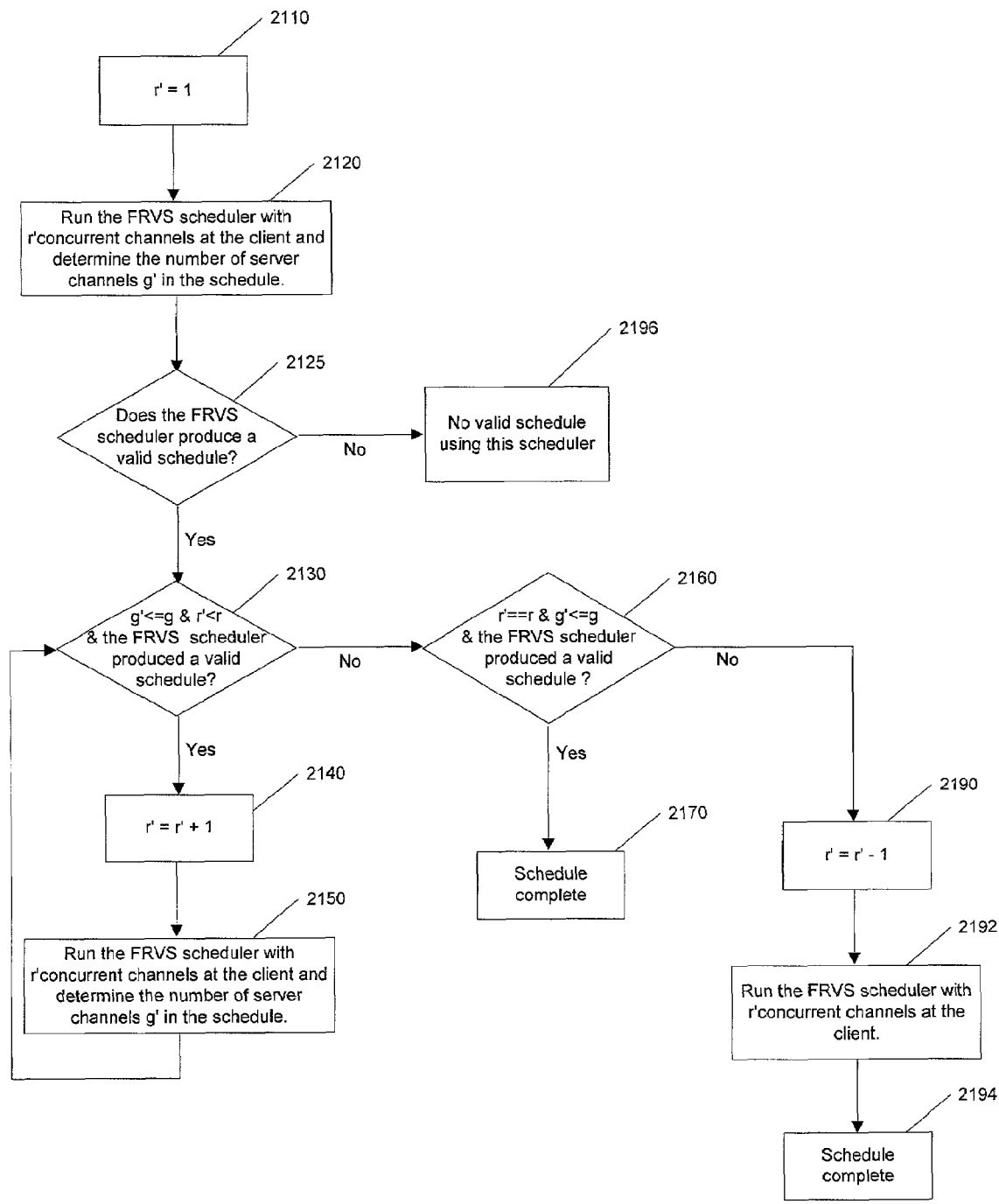
FIG. 20 is a simplified flow diagram of a process that may be used by the media object schedule generator shown in FIG. 2, to determine how to schedule a media object using a restricted server channel scheduler.

FIG. 20 is a simplified flow diagram of a method, according to an embodiment of the invention, that may be implemented by a media object schedule generator 214, using a RSC scheduler, to determine the size of each segment in a media object, so that the client can download the media object and play it out uninterrupted. This diagram is merely for illustrative purposes and is not intended to limit the scope of the claims herein. In this embodiment, the RSC scheduler finds the schedule produced by the FRVS scheduler with as many concurrent channels at the client as possible, and with at most g channels at the server. For the FRVS scheduler, when the number of concurrent channels at the client increases, the number of concurrent channels at the server usually increases as well, and the required server bandwidth usually decreases.

First, in steps 2110 and 2120, the RSC scheduler initializes r' to one and runs the FRVS scheduler on the media object with r' concurrent channels at the client. Then, in step 2125, the RSC scheduler checks if the FRVS found a valid schedule in step 2120, i.e., if the FRVS scheduler in FIG. 15 completed in step 1694. If no valid schedule was found, then in step 2196, the scheduler declares that there is no valid schedule using this scheduler. If it is, then in step 2130, the RSC scheduler checks if the number of server channels g' used by the schedule created by the FRVS scheduler is less than or equal to g, if r'<r, and if the current schedule produced by the FRVS scheduler is a valid schedule. If Yes, then in steps 2140 and 2150, the RSC scheduler increments r' and runs the FRVS scheduler again with r' concurrent channels at the client. Steps 2130, 2140 and 2150 repeat until the FRVS scheduler creates a schedule for which g'>g, r'=r, or for which the FRVS scheduler fails to produce a valid schedule. In step 2160, if r'=r, g'≦g, and the last schedule produced by the FRVS scheduler was a valid schedule, then the RSC scheduler can use the last schedule found by the FRVS scheduler to serve the media object so the scheduler finishes in step 2170. Otherwise, in step 2190, r' is decremented by 1. The RSC scheduler then uses the FRVS schedule with r' concurrent channels at the client found in step 2192 and finishes in step 2194.

In one embodiment, after step 2192, the RSC scheduler increases the number of segments in the FRVS schedule to be equal to g' by splitting some of the segments into two or more segments and adjusting the bandwidth to serve each segment accordingly. In another embodiment, the RSC scheduler does not decrease r' in step 2190, and instead decreases the number of segments in the FRVS schedule by combining segments and the bandwidth used to download the segments. In another embodiment, the RSC scheduler can store each schedule Sched(i) generated by the FRVS scheduler, for i=1,2, . . . r', and use the schedule Sched(i) that requires the least server bandwidth Rs.

The RSC scheduler can also be used without a restriction on the maximum number of concurrent channels at the client r by not comparing r' to r in steps 2130 and 2160.

Client Temporary Storage Requirement

An additional constraint for the media object schedule generator 214 to consider is the maximum client temporary storage requirement when the media object is not being stored at the client. When the client starts to play out block i, it has already played out the first i blocks, so the client only needs to store the data that has already been downloaded, but not yet played out. Similarly, in the time that block i is played out, whatever information that is downloaded about blocks i+1 to n−1 should be stored at the client in temporary storage. Define Tf(i)=T(i+1)−T(i) to be the play out time for block i and D(j,i) to be the fraction of the time that block j is scheduled to be downloaded by the client when block i is playing out. Note that since block j has already been downloaded by the time block i is playing out for j≦i, D(j,i)=0, for j≦i.

The additional storage required at the client for blocks i+1 to n−1 while block i is playing out is defined to be $$AS(i) = Tf(i) \cdot \sum_{j=i+1}^{n-1} rb(j) \cdot D(j, i) \text{ Mbits.} \qquad \text{(Equ. 11)}$$

During the same time interval, block i plays out, so b(i) Mbits of temporary storage is freed for use by other blocks.

Define M(i) to be the total client temporary storage requirement as block i begins to play out, i.e., the amount of data that has been downloaded but not yet played out. The storage requirement after block i is played out can be calculated as the sum of the storage requirement after block i−1 played out, and the difference between the amount of data downloaded and the amount of data played out when block i is playing out, i.e., M(i)=M(i−1)+AS(i)−b(i), for 0<i<n−1. The initial conditions is M(−1)=AS(−1), where AS(−1) is defined as the storage requirement when the play out commences, i.e., $$AS(-1) = Ts \cdot \sum_{j=0}^{n-1} rb(j) \cdot D(j-1) \text{ Mbits.} \qquad \text{(Equ. 12)}$$

The maximum client temporary storage requirement is defined to be Mmax=max {M(i)}. The temporary storage requirement at the client is increasing when the amount of data downloaded during the play out of block i is greater than the size of block i. If the client reception rate is non-increasing over time, then Mmax occurs at the first index i for which the average client reception rate is less than the play out rate.

Since each segment should be downloaded completely before it can be played out, the client maximum temporary storage requirement is at least as large as the size of the largest segment. Thus, it may be preferable to increase the server bandwidth and the total number of segments the media content is broken into, and then place an upper limit on the size of any one segment when the client storage is limited.

One method of reducing the client temporary storage requirement is to download the content as late as possible. This is in conflict with the goal of reducing the server bandwidth Rs, where generally a block is scheduled to be downloaded as slowly as possible. Another method of reducing the client temporary storage requirement, is to change the schedule at a point before the index i, for which the storage requirement is a maximum. In one embodiment, the segment or block with the highest index that is downloaded before the index i for which Mmax=M(i) will be scheduled to be downloaded at a later time, in order to decrease the maximum client temporary storage requirement. In another embodiment, the segment or block which uses the greatest amount of temporary storage at the index i for which Mmax=M(i) will be scheduled to be downloaded at a later time, in order to decrease the maximum client temporary storage requirement. In a further embodiment, a subset of segments are downloaded later to reduce the maximum storage requirement, where these segments are selected based on factors such as when these segments are actually required to be played out by the media object player, and how much of the temporary storage requirement these segments are using at time T(i) for which Mmax=M(i).

For an OSB scheduler for which the media object schedule generator 214 partitions the media object into segments of the minimum block size Bmin, for i=0, . . . , n−1, when the client starts to play out block i, the time already spent downloading the last n−i blocks is equal to (i+m)·Tf seconds, i.e., the time to play out the first i blocks plus the startup time, Ts=m·Tf. The maximum storage requirement at the client, occur for the smallest i such that M(i+1)<M(i), or when i≈(n+m−1)/(e)−m. Therefore, the maximum client storage requirement is Mmax≈(n·Tf·Rp)/e. Since the size of the media content is n·Tf·Rp Mbits, the client should store a maximum of approximately 37% of the entire media content. To reduce the storage requirement, the client can download segments S((n+m−1)/e−m) to S(n−1) at a later point in the schedule, and at a higher rate.

For example, consider a two hour movie with a play out rate Rp=4 Mbps and a startup latency of 1 minute. If the minimum block size Bmin=40 Mbits, then Tf=Bmin/Rp=10, n=720 and m=6. If Eps(N(i))=0, then the maximum temporary storage requirement for OSB is 9.1 Gbits, which is about 32% of the media object, which in this example is slightly less than the approximation above of 37%.

For a VRFS, FRVS and RSC scheduler, the maximum storage requirement at the client can be upper bounded as follows. Consider the first point in the schedule T(i) for which the designed client reception rate is less than the play out rate for the media object, and at which all the segments have already been scheduled for downloading, i.e., I(i)≦T(i) for i=0, 1, . . . , n'−1. The maximum amount of data that a client could have downloaded but not yet played out at this point is (Rd−Rp)·T(i), so Mmax≦(Rd−Rp)·T(i) Mbits.

For example, consider again the two hour movie with a play out rate Rp=4 Mbps, a startup latency of 1 minute, and a segment size Bmin=40 Mbits, for all the segments. If Rd=2Rp and Eps(N(i))=0, then the maximum temporary storage requirement for VRFS is 6.2 Gbits, which is about 22% of the media object. Note that the maximum temporary storage requirement for VRFS is 2.9 Gbits less than for OSB, since in this example VRFS schedules all but the first 35 segments for downloading at a later point in the schedule and a higher rate than the OSB scheduler.

The designed client reception rate is less than the play out rate for the first time as block 172 begins to play out. The last segment is scheduled for downloading when block 137 starts playing out, so T(172)=Ts+172·Tf=1780 seconds. The general upper bound above yields Mmax≦(8−4)·1780=7.1 Gbits which is about 15% greater than the actual temporary storage requirement.

Maximum Server Bandwidth Requirements and Transitioning Between Serving Media Objects When the maximum server bandwidth Rsmax is limited, then the server will have a maximum number of media objects that can be served simultaneously. In order to add a media object, the server may have to stop serving one or more of the media objects currently being served. The transition of dropping one or more media objects and starting to serve another should be done so that users can view each media object for as long as possible. In one embodiment, for the media objects being dropped, the server stops serving the segments in order, i.e., the segments from the beginning stop being served first, and for the media object being added, the server starts serving the segments in order i.e., the segments from the beginning are served first.

Consider a media object that a client may start downloading and playing out on demand starting at time t. Since the schedule is designed so that segment S(i) starts downloading at the client I(i) seconds after the client requests the content, the server should start serving segment S(i) by time t+I(i) for i=0, 1, . . . , n'−1. The bandwidth at the server required to serve segment S(i) is therefore only needed at time t+I(i).

For each media object that is scheduled to stop being served, enough segments from these media objects have to stop being served by time t+I(i), so that there is $$\sum_{j=0}^{i-1} r(j)$$

Mbps of bandwidth available at the server to serve segments S(0) thru S(i), for i=0, 1, . . . , n'−1.

In one embodiment, the next segment S(j) that will stop being served is the segment S(j) among all the media objects that are no longer to be served with the smallest E(j). Define Te(j) to be the time that segment S(j) stops being served at the server. Define T0(j)=Te(j)−E(j) to be the latest startup time at which a client can request the media object and still complete downloading segment S(j). A media object that is no longer being served will be no longer available to a client for downloading at the smallest time T0(j), for j=0, 1, . . . , n'−1 for that media object.

For example, consider a pair of 2 hour movies with the same play out rate Rp=4 Mbps, the same startup latency of 1 minute, and the same minimum block size of 40 Mbits. If Rd=2Rp, Eps(N(i))=0, r=5, and the FRVS scheduler is used to schedule both movies, then both movies are partitioned into n'=17 segments, where the segment S(i) is the same size and scheduled to be served at the same rate for each movie. The required server bandwidth for each movie is Rs=27.2 Mbps. If the maximum server bandwidth Rsmax=27.2 Mbps, then only one of these movies can be served at a time from this server. The schedule pairs for the two movies are (I(0), E(0))=(0, 60) (I(1), E(1))=(0, 84)
(I(2), E(2))=(0, 118) (I(3), E(3))=(0, 165)
(I(4), E(4))=(0, 231) (I(5), E(5))=(60, 323)
(I(6), E(6))=(84, 428) (I(7), E(7))=(118, 565)
(I(8), E(8))=(165, 744) (I(9), E(9))=(231, 976)
(I(10), E(10))=(323, 1274) (I(11), E(11))=(428, 1655)
(I(12), E(12))=(565, 2146) (I(13), E(13))=(744, 2779)
(I(14), E(14))=(976, 3592) (I(15), E(15))=(1274, 4639)
(I(16), E(16))=(1655, 4844)

Consider the case where the second movie is scheduled to start at t=7:00 pm. If the server stops serving all the segments for the first movie, and starts serving all the segments for the second movie at t=7:00 pm, then any client that has not downloaded the entire first movie at this point will be unable to finish watching the movie, i.e., any client that is not watching the last segment S(16) of the first movie at t=7:00 pm. Since segment S(16) is N'(16)=N(16)=5101.6 Mbits and takes N'(16)/Rp=5101.6/4=1275.4 seconds to play out, which is approximately 21 minutes, any client that requests the movie after approximately 5:20 pm will not be able to watch the whole movie. Therefore, the server should stop serving the movie to new clients after approximately 5:20 pm.

Alternatively, if the server starts serving the segment S(i) of the second movie I(i) seconds after 7:00pm, and stops serving the segment S(i) of the first movie at this time, then the segments of the first movie stop serving in order. Similarly, the segments from the second movie start serving in order. A segment in the second movie only starts being served, when it is first possible for any client to request that segment to be downloaded. Since r=5, at 7:00 pm the server stops serving the segments S(0) thru S(4) of the first movie. At 7:01 pm, the server stops serving the segment S(5) of the first movie, and so on until segment S(16) of the first movie stops being served at about 7:28 pm. For this example, the time Te(i)=t+I(i) for each segment and the time T0(i)=Te(i)−E(i)=t+I(i)−E(i) for i=0,1, . . . , 16. The minimum T0(i) is for i=15 where T0(15) is approximately 6:04 pm. Therefore in this example, the first movie can be served for an extra 44 minutes without affecting the delivery of the second movie.

Incremental Scheduling of a Media Object

All of the above scheduling methods, with the exception of OSB, do not require the scheduler to know the total length of the media object in order to schedule the media object since the scheduler can be run incrementally as the rest of the media object arrives to be served. Because of this, all of these schedulers can be used to perform on demand scheduling for a media stream. The stream is partitioned into blocks and segments as the content becomes available to the server. The media object description at the client can be updated by information sent on the channels that it has already joined. Alternatively, the client can use the client browser to update the media object description, or can implement the same functionality as the media object schedule generator 214 to determine what to do next.

It is to be understood that, in the above description, many of the steps and/or procedures may be performed in a concurrent manner (i.e., pipelined) in order to increase throughput. For example, with an MOD server, all the output symbols in a segment need not first be generated before transmitting any of the output symbols in the segment. Rather, output symbols of one block may be transmitted concurrently with the generation of output symbols in another block. Also, completed output symbols of a block may be transmitted concurrently with the generation of other output symbols of the same block. As another example, with an MOD client, all of the blocks in a segment need not be first reassembled before playing out any of the blocks in the segment. Rather, one block may start playing out concurrently with the reassembly of another block. Similarly, the downloading of one segment may occur concurrently with the reassembling and/or playing out of blocks in a second segment. In yet another example, the reassembling of blocks in one segment may occur concurrently with the playing out of blocks in a second segment. One skilled in the art will recognize many other steps in the above description that may similarly be concurrently performed.

Additionally, it is to be understood that the various functional blocks in FIGS. 1–4, 5–6, may be implemented by a combination of hardware and/or software, and that in specific implementations some or all of the functionality of some of the blocks may be combined. Similarly, it is also to be understood that the various methods discussed herein may be implemented by a combination of hardware and/or software.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of scheduling a media object for transmission between a server and a client, the method comprising:
    partitioning the media object into segments, wherein the segments contain one or more blocks, wherein each block is a unit of media for which the client will wait to receive an entire block before playing out the block, and wherein each segment includes an integer number of blocks and wherein blocks are encoded into output symbols such that the output symbols generated are independent of when a client begins reception, wherein the output symbols are encoded such that they are transmittable to the client in a manner that is independent of which other output symbols were transmitted to the client;
    determining one or more channels on which to serve each segment, the channels capable of carrying data between the server and the client;
    determining a rate at which to serve each segment; and
    determining a schedule pair for each channel, the schedule pair including a time at which the client may start receiving on the channel and a time at which the client may stop receiving on the channel.

2. The method of claim 1 wherein if the client minimally fulfills the schedule pair for each channel, the client will be able to play out the media object uninterrupted after a startup latency.

3. The method of claim 1 wherein the partitioning step includes first partitioning the media object into segments, then partitioning each segment into an integer number of blocks.

4. The method of claim 1 wherein the partitioning step includes first partitioning the media object into blocks, then grouping the blocks into segments.

5. The method of claim 1 wherein a maximum download rate at the client is less than an aggregate server transmission rate.

6. The method of claim 1 wherein the client is configured with a maximum download rate that does not limit the rate that each segment is served.

7. The method of claim 1 wherein a maximum download rate at the client is only slightly greater than a media object play out rate.

8. The method of claim 1 wherein a maximum download rate at the client is less than a media object play out rate.

9. The method of claim 1 wherein at least one segment includes more than one block.

10. The method of claim 1 wherein each segment includes exactly one block.

11. The method of claim 1 wherein a plurality of blocks in a segment are a same size.

12. The method of claim 1 wherein a plurality of blocks in a plurality of segments are a same size.

13. The method of claim 1 wherein at least two of the channels are served at different rates.

14. The method of claim 1 wherein at least two segments have different sizes.

15. The method of claim 1 wherein each block in each segment is served at a same rate.

16. The method of claim 1 wherein at least one block in at least one segment is served at a rate different than other blocks in the segment.

17. The method of claim 1 wherein the segments are served at a rate less than a play out rate.

18. The method of claim 1 wherein at least one segment is served on at least two channels, and wherein each of the at least two channels is served at a rate.

19. The method of claim 18 wherein the each of the at least two channels are served at a same rate.

20. The method of claim 18 wherein at least two of the each of the at least two channels are served at different rates.

21. The method of claim 1 wherein the number of channels is less than or equal to a maximum number of concurrent channels at the client.

22. The method of claim 2 wherein the client can minimally fulfill the schedule pair for each channel by downloading from a maximum number of concurrent channels.

23. The method of claim 1 wherein the number of channels is less than or equal to a maximum number of concurrent channels served by the server.

24. The method of claim 1 wherein the partitioning, determining one or more channels, determining a rate, and determining a schedule pair steps are performed so as to optimize a server bandwidth required to serve the media object.

25. The method of claim 1 wherein the partitioning, determining one or more channels, determining a rate, and determining a schedule pair steps are performed so that the media object is served to the client at a rate less than or equal to a maximum client download rate.

26. The method of claim 1 further comprising, for each of the plurality of segments, determining a size of the segment so that the segment is completely downloaded by the client prior to when the segment is due to be played out.

27. The method of claim 26 wherein, for each of the plurality of segments, the rate at which to serve the segment is an integer multiple of a base rate.

28. The method of claim 26 wherein all of the segments are served at a same rate.

29. The method of claim 1 further comprising, for each of a plurality of segments:
 if the segment may be scheduled to be served to the client without exceeding a maximum client download rate, scheduling the segment to be served to the client; and
 if the segment may not be scheduled to be served to the client without exceeding the maximum client download rate, waiting to schedule the segment to be served until one or more other segments are scheduled to end being downloaded at the client.

30. The method of claim 1 wherein the partitioning, determining one or more channels, determining a rate, and determining a schedule pair steps are performed so as to optimize a number of concurrent channels at the server required to serve the media object.

31. The method of claim 1 wherein sizes of a plurality of blocks are each less than or equal to a maximum block size.

32. The method of claim 1 wherein sizes of a plurality of segments are each less than or equal to a maximum segment size.

33. The method of claim 32 wherein the maximum segment size is based on a maximum available storage at the client.

34. The method of claim 1 wherein sizes of a plurality of blocks are each greater than or equal to a minimum block size.

35. The method of claim 34 wherein the minimum block size is determined by an encoding scheme.

36. The method of claim 34 wherein the minimum block size is determined by a media object player data format.

37. The method of claim 1 wherein the partitioning step includes, for each of a plurality of segments, determining a start point of the segment and an end point of the segment based upon requirements of a media object player data format.

38. The method of claim 1 wherein the partitioning step includes, for each of a plurality of blocks, determining a start point of the block and an end point of the block based upon requirements of a media object player data format.

39. The method of claim 1 wherein the rate and the schedule pair are based on a maximum available storage at the client.

40. The method of claim 1 wherein the rate varies over time.

41. The method of claim 1 wherein at least one segment is served on at least two channels, and wherein a rate at which the segment is served on one of the at least two channels varies over time.

42. The method of claim 1 wherein a set of channels serving at least one segment varies over time.

43. The method of claim 1, wherein the blocks are encoded into the output symbols according to a chain reaction code.

44. A system for scheduling a media object for transmission between a server and a client, comprising:
 a module for partitioning the media object into segments, wherein the segments contain one or more blocks, wherein each block is a unit of media for which the client will wait to receive an entire block before playing out the block, and wherein each segment includes an integer number of blocks and wherein blocks are encoded into output symbols such that the output symbols generated are independent of when a client begins reception wherein the output symbols are encoded such that they are transmittable to the client in a manner that is independent of which other output symbols were transmitted to the client;
 a module for determining one or more channels on which to serve each segment, the channels capable of carrying data between the server and the client;
 a module for determining a rate at which to serve each segment; and
 a module for determining a schedule pair for each channel, the schedule pair including a time at which the client may start receiving on the channel and a time at which the client may stop receiving on the channel.

45. A method of serving a media object, the method comprising:
 receiving segments of a media object, wherein each segment includes an integer number of blocks, wherein each block is a unit of media for which a client will wait to receive an entire block before playing out the block, and wherein each block includes one or more input symbols;
 for each segment, receiving an indication of one or more channels on which to serve the segment;
 for each segment, receiving a rate at which to serve the segment;
 determining an order in which to encode blocks;
 generating output symbols for each block using a chain reaction code to generate the output symbols; and
 transmitting the output symbols on the corresponding one or more channels, wherein each segment is served at the corresponding rate.

46. The method of claim 45 further comprising providing one or more storage devices on which to store the media object.

47. The method of claim 45 wherein the receiving a rate step includes receiving an aggregate rate at which to serve the segment on the one or more channels.

48. The method of claim 45 wherein the receiving a rate step includes, for each of the one or more channels on which to serve the segment, receiving a rate at which to serve the segment on the each of the one or more channels.

49. The method of claim 45 wherein a server serves at least two media objects concurrently.

50. The method of claim 45 wherein a media object is concurrently served on at least two servers.

51. The method of claim 50 wherein at least one segment is concurrently served on at least two servers.

52. The method of claim 50 wherein at least one segment is served on only one server.

53. The method of claim 45 wherein the media object is served on unicast channels.

54. The method of claim 45 wherein the media object is served on multicast channels.

55. The method of claim 45 wherein the media object is served on broadcast channels.

56. The method of claim 45 wherein generating output symbols includes using a FEC code to generate output symbols.

57. The method of claim 56 wherein all of the output symbols in a block are generated before transmitting any of the output symbols in the block.

58. The method of claim 56 wherein for some or all of the plurality of output symbols, each of the some or all of the output symbols is generated upon a first transmission of the output symbol on the channel.

59. The method of claim 56, further including determining an order in which to transmit output symbols corresponding to a block, and wherein transmitting output symbols includes transmitting output symbols corresponding to a block in the order.

60. The method of claim 59 wherein the order is determined according to a random or pseudo-random sequence.

61. The method of claim 45, further including determining an order in which to transmit output symbols for each block in a segment, and wherein transmitting output symbols includes, for each segment, transmitting output symbols corresponding to each block in the order.

62. The method of claim 61 wherein the order is determined according to a random or pseudo-random sequence.

63. The method of claim 45 wherein input symbols are used as output symbols.

64. The method of claim 45 wherein a server transitions between serving a first media object and a second media object by successively stopping the serving of segments for the first media object and successively starting the serving of segments for the second media object.

65. The method of claim 45 wherein the rate at least one segment is served on a channel varies over time.

66. The method of claim 45 wherein at least one segment is served on at least two channels.

67. The method of claim 45 wherein, for at least one segment, the one or more channels on which the segment is served varies over time.

68. An apparatus for serving a media object, comprising:
a block encoder coupled to receive segments of a media object, wherein each segment includes an integer number of blocks, wherein each block is a unit of media for which a client will wait to receive an entire block before playing out the block, wherein each block includes one or more input symbols; the block encoder including an input to receive an order in which to encode the blocks; and wherein the block encoder is configured to generate, in the order, output symbols for each block wherein blocks are encoded into output symbols such that the output symbols generated are independent of when a client begins reception, wherein the output symbols are encoded such that they are transmittable to the client in a manner that is independent of which other output symbols were transmitted to the client; and
a transmitter coupled to receive the output symbols from the block encoder, and coupled to receive, for each segment, an indication of one or more channels on which to serve the segment and a rate at which to serve the segment;
said transmitter configured to serve the output symbols on the corresponding one or more channels at the corresponding rate.

69. A method of receiving a media object that includes segments, wherein each segment includes an integer number of blocks, and wherein each block is a unit of media for which a client will wait to receive an entire block before playing out the block, the method comprising:
receiving a media object description of the media object;
joining and leaving each of a plurality of channels according to the media object description to download the blocks as a plurality of output symbols wherein the output symbols are encoded such that the output symbols need not depend on when joining and leaving occurs, wherein the output symbols are encoded such that they are transmittable to the client in a manner that is independent of which other output symbols were transmitted to the client;
reassembling the blocks in each segment; and
playing the blocks out in an order after a startup latency.

70. The method of claim 69 wherein a client joins channels according to an order in the media object description.

71. The method of claim 69 wherein, reassembling the blocks of a first segment and playing out the blocks of a second segment occur concurrently.

72. The method of claim 69 wherein segments are downloaded on unicast channels.

73. The method of claim 69 wherein segments are downloaded on multicast channels.

74. The method of claim 69 wherein segments are downloaded on broadcast channels.

75. The method of claim 69 wherein a plurality of segments are downloaded concurrently at an aggregate rate, and wherein the aggregate rate is less than a maximum download rate.

76. The method of claim 69 wherein the media object is downloaded by a client at a rate less than an aggregate server transmission rate.

77. The method of claim 69 wherein the media object is downloaded by a client at an unconstrained rate.

78. The method of claim 69 wherein the media object is downloaded by a client at a rate only slightly greater than a media object play out rate.

79. The method of claim 69 wherein the media object is downloaded by a client at a rate less than a media object play out rate.

80. The method of claim 69 wherein joining and leaving a plurality of channels includes downloading at least a first segment upon the ending of the downloading of a second segment.

81. The method of claim 69 wherein a rate at which the media object is downloaded may be adjusted by joining and leaving channels.

82. The method of claim 81 wherein a client increases its reception rate by adding channels according to an order and decreases its reception rate by dropping channels either in a reverse of the order, or when a segment completes downloading on that channel.

83. The method of claim 81 wherein a client increases its reception rate when it experiences no congestion and decreases its reception rate when it experiences congestion.

84. The method of claim 69 wherein the blocks include original data, and wherein reassembling the blocks in each segment includes reordering the original data according to its temporal position in each block.

85. The method of claim 69 wherein reassembling the blocks in each segment includes decoding with a FEC decoder.

86. The method of claim 69 wherein reassembling the blocks in each segment includes decoding with a chain reaction decoder.

87. The method of claim 69 wherein a single media object is downloaded from at least two servers.

88. The method of claim 87 wherein at least one segment is downloaded from at least two servers.

89. The method of claim 87 wherein at least one segment is downloaded from only one server.

90. The method of claim 69 wherein a same segment in the media object is downloaded from at least two servers.

91. The method of claim 69 further comprising playing out a pre-downloaded segment during the startup latency.

92. The method of claim 69 wherein the media object is downloaded by a client from a maximum number of channels concurrently.

93. The method of claim 69 wherein a set of channels on which at least one segment is downloaded varies over time.

94. A system for receiving a media object that includes segments, wherein each segment includes an integer number of blocks, and wherein each block is a unit of media for which a client will wait to receive an entire block before playing out the block, comprising:

- a module for handling input of a media object description of the media object;
- a module for handling channel joins and channel leaves for each of a plurality of channels according to the media object description, wherein the channels are capable of use for downloading the blocks to the client as a plurality of output symbols wherein the output symbols are encoded such that the output symbols need not depend on when joining and leaving occurs, wherein the output symbols are encoded such that they are transmittable to the client in a manner that is independent of which other output symbols were transmitted to the client;
- a module for reassembling the blocks in each segment; and
- a module for playing the blocks out in an order after a startup latency.

* * * * *